(12) United States Patent
Watanabe et al.

(10) Patent No.: US 8,304,103 B2
(45) Date of Patent: Nov. 6, 2012

(54) BATTERY STRUCTURE

(75) Inventors: Kyoichi Watanabe, Yokohama (JP); Hajime Sato, Yokohama (JP); Kenji Hosaka, Yokosuka (JP); Hideaki Horie, Yokosuka (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 403 days.

(21) Appl. No.: 11/750,005

(22) Filed: May 17, 2007

(65) Prior Publication Data

US 2007/0269714 A1 Nov. 22, 2007

(30) Foreign Application Priority Data

May 20, 2006 (JP) ................................. 2006-140969

(51) Int. Cl.
*H01M 10/50* (2006.01)
*H01M 6/46* (2006.01)
*H01M 10/18* (2006.01)

(52) U.S. Cl. .......................... 429/120; 429/152; 429/210

(58) Field of Classification Search ........................ None
See application file for complete search history.

(56) References Cited

U.S. PATENT DOCUMENTS

| | | | | |
|---|---|---|---|---|
| 4,042,760 A | * | 8/1977 | Land ............................ | 429/162 |
| 4,080,728 A | * | 3/1978 | Buckler ........................ | 29/623.4 |
| 5,885,732 A | * | 3/1999 | Verhoog ...................... | 429/176 |
| 5,958,088 A | * | 9/1999 | Vu et al. ....................... | 29/623.1 |
| 2003/0008205 A1 | * | 1/2003 | Horie et al. .................. | 429/120 |
| 2006/0090492 A1 | | 5/2006 | Ahn | |
| 2006/0127763 A1 | * | 6/2006 | Watanabe et al. ............. | 429/209 |

FOREIGN PATENT DOCUMENTS

| | | |
|---|---|---|
| EP | 0 522 981 A1 | 1/1993 |
| EP | 0 613 204 A1 | 8/1994 |
| JP | 11-130900 | 5/1999 |
| JP | 2000-100471 | 4/2000 |
| JP | 2000-195495 | 7/2000 |
| JP | 2005-071784 | 3/2005 |
| JP | 2005-149833 | 6/2005 |
| JP | 2005-340089 | 12/2005 |
| JP | 2006-173095 | 6/2006 |
| JP | 2006173095 A * | 6/2006 |
| WO | 89/10011 A1 | 10/1989 |

OTHER PUBLICATIONS

Sheet. (2010). In Merriam-Webster Online Dictionary, Retrieved May 26, 2010, from http://www.merriam-webster.com/dictionary/sheet.*

* cited by examiner

*Primary Examiner* — Emily Le
*Assistant Examiner* — Sarah A Slifka
(74) *Attorney, Agent, or Firm* — Young Basile

(57) ABSTRACT

A battery structure for improving a heat dissipating property and a vibration absorbing performance. The battery structure comprises a plurality of unit cell layers, each formed by alternately stacking a cathode active material layer formed on a surface of one collector, a separator for retaining an electrolyte and an anode active material layer formed on a surface of another collector. The battery structure also comprises a heat dissipating member disposed between at least one unit cell layer and another unit cell layer.

27 Claims, 9 Drawing Sheets

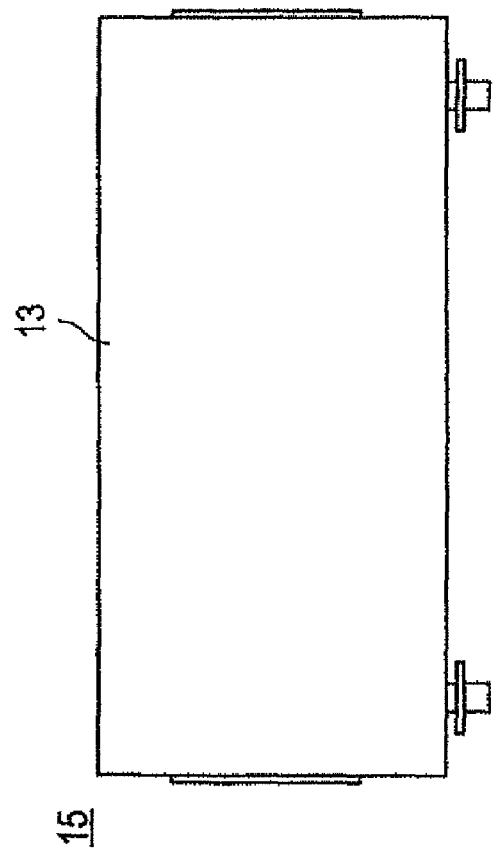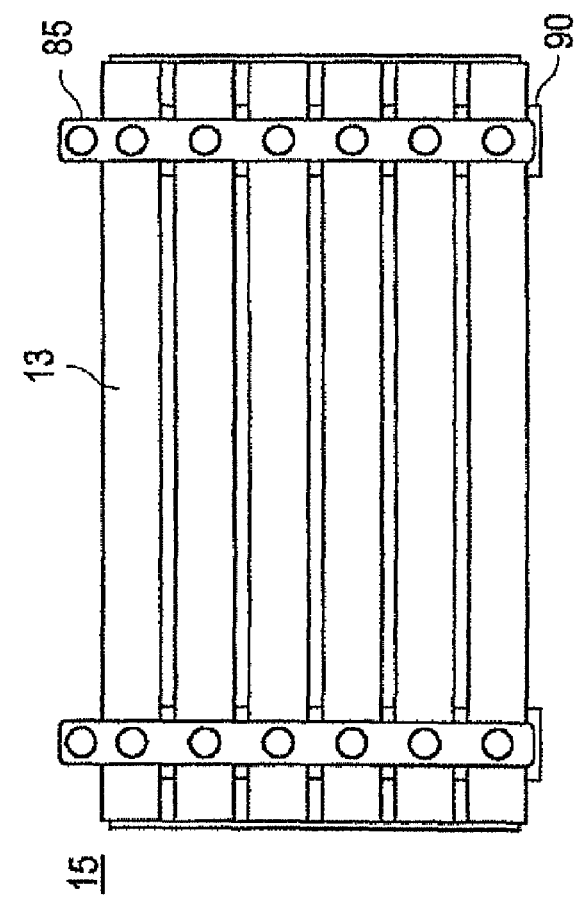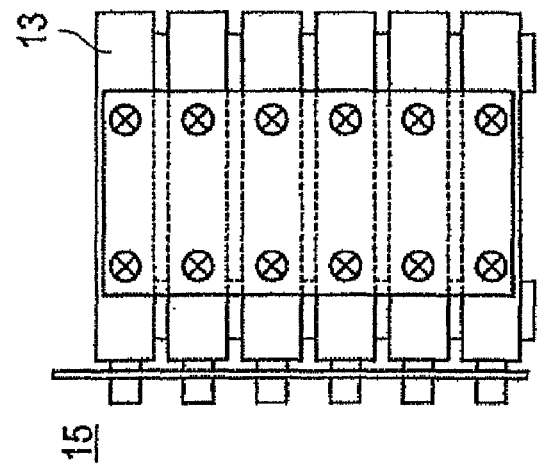

BATTERY STRUCTURE

CROSS-REFERENCE TO RELATED APPLICATION

This application claims priority to Japanese Patent Application No. 2006-140969, filed on May 20, 2006, which is incorporated herein in its entirety by reference.

TECHNICAL FIELD

The invention relates in general to a battery structure, and more particularly to a battery structure having an improved heat dissipating property.

BACKGROUND

Air pollution caused by exhaust fumes from automobiles has recently become a global problem. Hence, there has been an increased movement toward environmental protection throughout the world. As a means for solving such a problem, an electric vehicle using electricity as its power source and a hybrid vehicle combining an engine and an electric motor have been introduced. Thus, the development of a battery with increased capacity and power, which can be mounted in the electric and hybrid vehicles, is fast becoming important in the automobile industry.

In order to develop such a battery with high capacity and power, an electrode area of the battery must be quite large or a number of cell elements must be stacked upon one another.

However, when the cell elements are stacked, a heat dissipating property of the battery may be deteriorated due to the increased thickness of the battery. That is, when a charging/discharging operation is repeated at a high current, the heat generated by an inner resistance of the battery cannot be rapidly dissipated. Thus, the temperature of the battery inevitably increases to an excessive level. As such, when the heat dissipating property of the battery deteriorates, it may reduce the power or service life of the battery.

For example, Japanese Laid-Open Patent Publication Nos. 2000-100471 and 2000-195495 disclose a bipolar-type battery having a structure wherein bipolar-type electrodes (an electrode wherein a cathode active material layer, a collector and an anode active material layer are stacked in that order) and separators are alternately stacked upon one another. In such a battery, the amount of heat generation is quite large in the cathode active material layer and the anode active material layer. Therefore, when the high capacity and power are required, this is likely to increase the temperature within the battery to thereby deteriorate the heat dissipating property. Consequently, the electrolyte and other components included in the battery are likely to become deteriorated.

Despite the above-described problems of the batteries currently existing in the art, no research or study is presently underway so as to protect the elements of the battery structure from heat.

SUMMARY

Embodiments of the invention provide a battery structure with an improved heat dissipating property. One embodiment of a battery structure taught herein comprises a plurality of stacked unit cell layers. Each unit cell layer is formed by alternately stacking a cathode active material layer formed on a surface of one collector, a separator for retaining an electrolyte and an anode active material layer formed on a surface of another collector. The battery structure also includes a heat dissipating member disposed between at least one unit cell layer and another unit cell layer.

Embodiments of a battery assembly comprising battery structures taught herein are also disclosed, as are vehicles incorporating such structures or assemblies.

Methods of manufacturing a battery structure are also taught herein. One method comprises, by example, alternately stacking a cathode active material layer formed on a surface of one collector, a separator for retaining an electrolyte, and an anode active material layer formed on a surface of second collector to form a first unit cell layer; alternately stacking a cathode active material layer formed on a surface of a third collector, a separator for retaining an electrolyte, and an anode active material layer formed on a surface of a fourth collector to form a second unit cell layer; and disposing a heat dissipating member between the first unit cell layer and the second unit cell layer.

BRIEF DESCRIPTION OF THE DRAWINGS

The description herein makes reference to the accompanying drawings wherein like reference numerals refer to like parts throughout the several views, and wherein:

FIGS. 5A, 5B and 5C (collectively, FIG. 5) are schematic views illustrating the components of a battery assembly constructed in accordance with a third embodiment of the invention wherein FIG. 5A illustrates a plan view, FIG. 5B illustrates a front view, and FIG. 5C illustrates a side view;

FIGS. 6A, 6B and 6C (collectively, FIG. 6) are schematic views illustrating the components of a battery assembly constructed in accordance with a fourth embodiment of the invention wherein FIG. 6A illustrates a plan view, FIG. 6B illustrates a front view, and FIG. 6C illustrates a side view;

DETAILED DESCRIPTION OF EMBODIMENTS OF THE INVENTION

A battery structure according to the invention is explained in detail in the first to fifth embodiments described below. Further, it should be understood that the thickness or shape of each layer of the battery structure is exaggerated in the provided drawings in order to facilitate the understanding of the invention.

Figure 1:
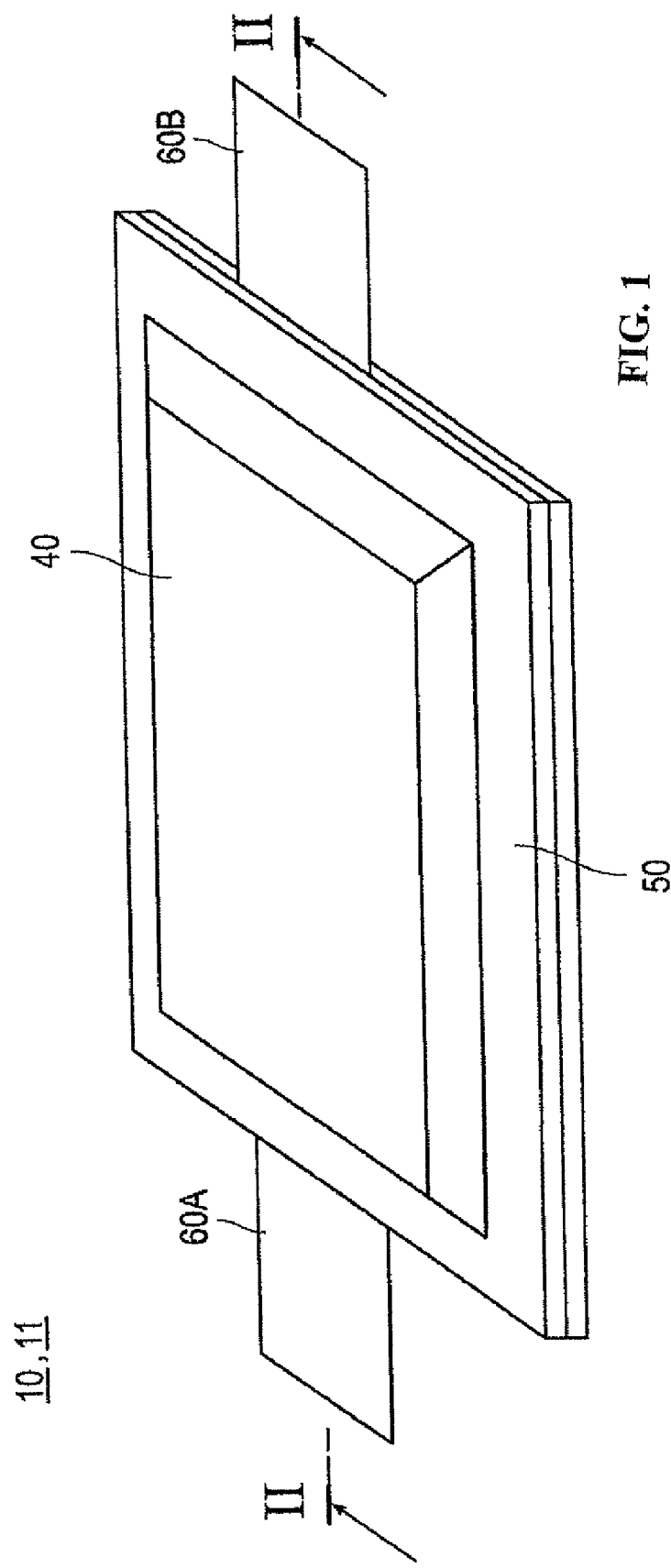
FIG. 1 is a schematic view illustrating a battery structure constructed in accordance with a first embodiment of the invention.
Figure 2:
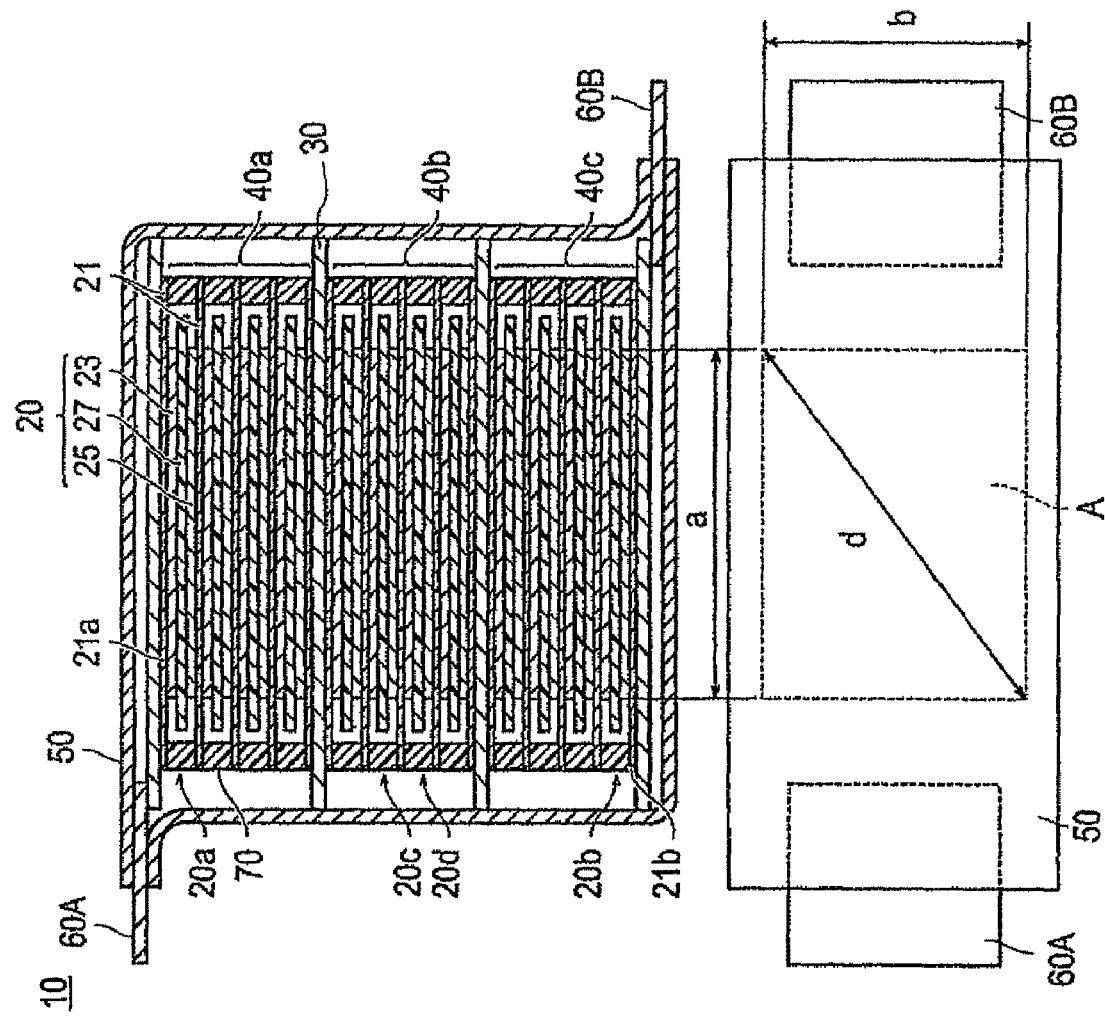
FIG. 2 is a schematic view illustrating an inner structure of the battery structure of FIG. 1.
Figure 3:
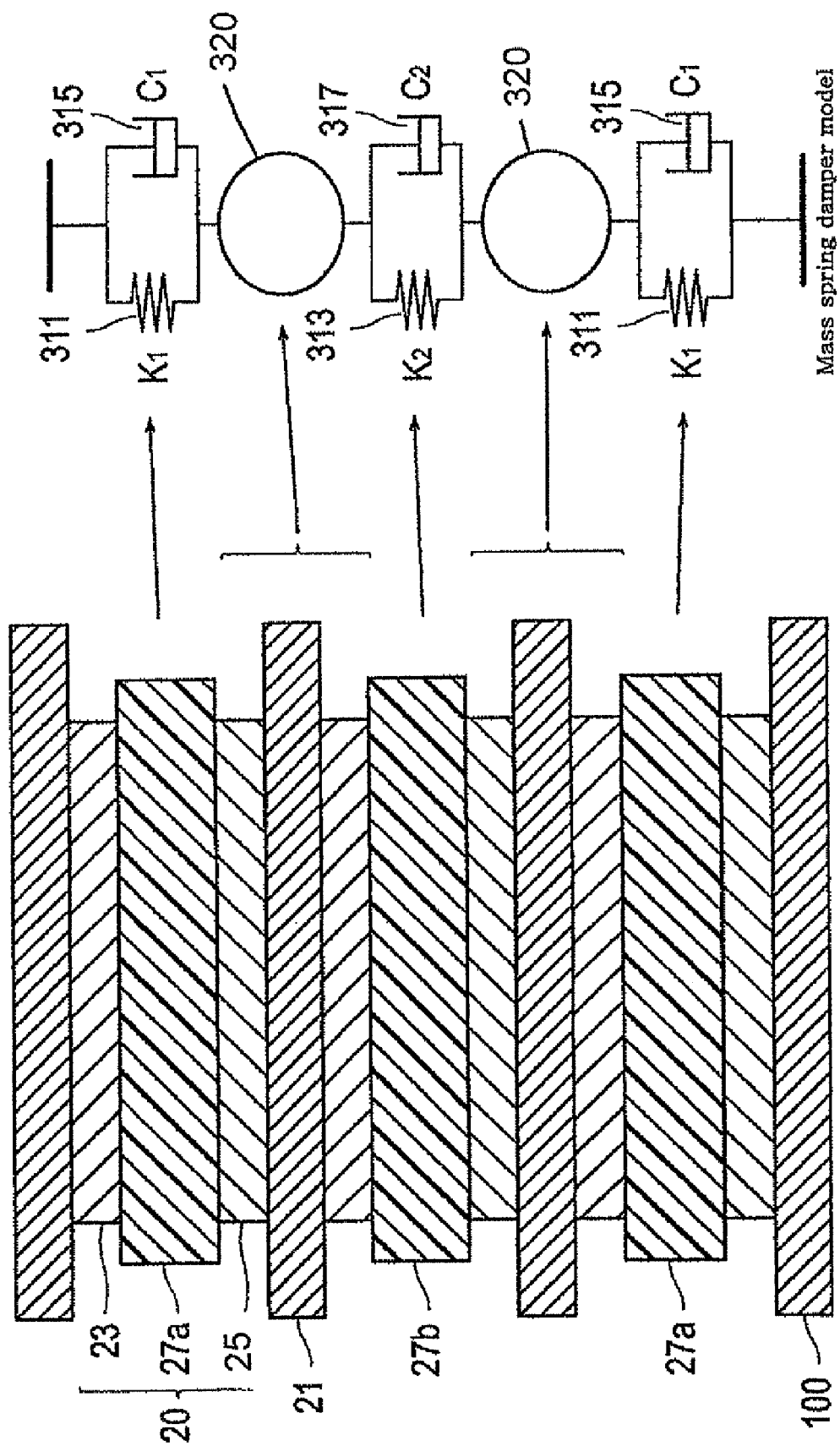
FIG. 3 illustrates a mass spring damper model of the battery structure of FIG. 1.

FIGS. 1 to 3 illustrate a battery structure constructed in accordance with a first embodiment of the invention. Specifically, FIG. 1 illustrates a schematic view of the battery structure constructed in accordance with this embodiment. Further, FIG. 2 is a schematic view illustrating an inner structure of the battery structure shown in FIG. 1. FIG. 3 illustrates a model of a vibration system for the battery structure constructed in accordance with this embodiment. Moreover, the battery structure according to embodiments of the invention may apply to a stacking-type battery structure wherein a plurality of sheet-like cell elements is stacked upon one another. However, in the present embodiment, a bipolar-type battery structure (bipolar-type battery) is specifically explained as an example among the stacking-type battery structures.

As shown in FIG. 1, the battery structure 10 has a generally rectangular planar shape. A cathode tab 60A and an anode tab 60B for extracting currents are configured to be pulled out from both sides of the battery structure 10. A cell element 40 is covered with a covering material (e.g., a laminate film) and a surrounding of the cell element 40 is thermally fused. Accordingly, the cell element 40 is sealed when the cathode tab 60A and the anode tab 60B are pulled out.

Next, an inner structure of the battery structure 10, which is constructed in accordance with this embodiment, is explained in detail in view of FIG. 2.

FIG. 2 is a schematic view illustrating an inner structure of the battery structure 10 shown in FIG. 1. The upper portion of FIG. 2 illustrates a cross-sectional view taken along the line II-II shown in FIG. 1, while the lower portion illustrates a schematic plan view to show the relation of the inner structure to the battery structure 10 shown in FIG. 1.

As shown in FIG. 2, the battery structure 10 comprises a plurality of cell elements 40a, 40b and 40c having unit cell layers 20 stacked upon one another. Each unit cell layer 20 is formed by alternately stacking a cathode active material layer 23 formed on a surface of one collector 21, a separator 27 for retaining an electrolyte and an anode active material layer 25 formed on a surface of another collector 21. The battery structure 10 also includes a heat dissipating member 30, a covering material 50 for preventing any physical contact with the outside and the cathode tab 60A and anode tab 60B for extracting currents from the battery structure 10. The direction of stacking the unit cell layers 20 (i.e., thickness direction of a battery) is referred to as a stacking direction. Also, the direction orthogonal to the stacking direction (i.e., direction in which the collector 21 extends) is referred to as a surface direction.

In the embodiment shown, each cell element 40a, 40b, 40c has a set of four unit cell layers 20 and is electrically connected in series by using the two heat dissipating members 30 in the stacking direction (i.e., upper-lower direction in FIG. 2). Such a type of electrical connection is referred to as 3-Serial.

The heat dissipating member 30 is provided between a lowermost unit cell layer 20 of the cell element 40a and an uppermost unit cell layer 20 of the cell element 40b, as well as between a lowermost unit cell layer 20 of the cell element 40b and an uppermost unit cell layer 20 of the cell element 40c. However, it should be noted that the heat dissipating member 30 is not limited to the above. For example, a region wherein the heat dissipating member 30 is interposed can be optionally selected depending on the desired use. It also appears that the heat dissipating property can be improved by installing a heat dissipating member 30 at an uppermost or lowermost surface of a unit cell, in addition to between cell elements 40a, 40b.

The planar cathode tab 60A and the anode tab 60B for extracting currents are disposed in such a manner so as to achieve surface-contact with the top and bottom surfaces in the stacking direction of the 3-Serial battery structure 10. The cathode tab 60A and the anode tab 60B are made from a conductive metallic plate such as copper, aluminum, stainless steel, etc. As shown in FIG. 2, the cathode tab 60A and a collector 21a positioned at an outermost layer of the cell element 40a (hereinafter simply referred to as an outermost layer collector) are electrically connected by using the heat dissipating member 30. Further, the anode tab 60B and an outermost layer collector 21b of the cell element 40c are electrically connected by using the heat dissipating member 30. Further, the battery structure 10 is formed by covering them with the covering material 50, which is used to enclose the 3-Serial cell elements 40a, 40b and 40c. An edge of the covering material 50 is bonded via thermal fusion, etc. To this end, the 3-Serial cell elements 40a, 40b and 40c are sealed inside the covering material 50.

As described, the battery structure 10 comprises three cell elements 40a, 40b and 40c and four heat dissipating members 30. It should be noted that the numbers of cell elements and heat dissipating members may optionally vary. Also, the covering material 50 may be appropriately provided depending on the status of use. The above is referred to as a battery structure 10 comprising the covering material 50, but the battery structure 10 may alternatively not include the covering material 50.

In the battery structure 10 constructed in accordance with the first embodiment, the heat dissipating member 30 is provided between the unit cell layers 40a, 40b, 40c so as to improve the heat dissipation performance inside the battery structure 10.

Further, as mentioned above, in order for a battery to have high capacity and power, the area of an electrode of the battery should be larger or the cell elements should be stacked. However, when the area of the electrode of the battery becomes larger or the cell elements are stacked, it becomes difficult to secure the rigidity of the battery. For example, when the battery such as the above-mentioned bipolar-type battery having a plurality of stacked layers requires high capacity and high power, the area of a bipolar-type electrode should be larger or the number of the stacked layers of a bipolar-type electrode should be increased. Therefore, when mounted in a vehicle, the battery is likely to be affected by the vibration of the vehicle. More specifically, when mounted in the vehicle the vibration from the vehicle may coincide with the natural frequency of the battery to thereby resonate the battery. When the battery resonates, an interlayer delamination is likely to occur wherein a space between the layers of the battery is partially or entirely delaminated. Accordingly, the power of the battery may be lowered due to the short circuit or the service life of the battery may be reduced.

However, the heat dissipating member 30 according to this embodiment of the battery structure 10 functions to absorb the vibration from outside such that the vibration of the battery structure 10 can be prevented. Consequently, an interlayer delamination between the elements (i.e., between the unit cell layers 40a, 40b, 40c) of the battery structure 10 can be prevented. Accordingly, the power or service life of the battery can be improved.

Hereinafter, each element of the battery structure 10 that is constructed in accordance with the first embodiment is explained in detail.

First the heat dissipating member 30 of this embodiment is explained. The heat dissipating member 30 is made from a material having a good thermal conductivity or vibration absorbing property. The heat dissipating member 30 functions to dissipate heat from the unit cell layer 20 (the detailed description thereof is explained below) of a cell element. Further, it is preferred that when the battery structure 10 functions to absorb the vibration from the outside, the rigidity of the battery structure 10 can be increased to thereby improve the vibration absorption property for the vibration caused from the outside (e.g., the natural frequency of the battery structure 10 deviates from a predetermined vibration from the outside such that resonance is prevented (hereinafter also referred to as the vibration absorption)).

The heat dissipating member 30, for example, is formed by dispersing a vibration absorbing material into a base material with heat dissipating property. More specifically, the heat dissipating member 30 could be formed from any material selected from the group consisting of a polymer material, a metal material, a composite material of a polymer material and a metal material, and a composite material in which a conductive material is dispersed into a polymer material.

It is preferred that the thermal conductivity of the heat dissipating member 30 is from 0.1 to 450 W/m·k. The heat dissipating member 30 may be formed from the materials mentioned above. Alternatively, the heat dissipating member 30 may be formed from a rubber material (having a thermal conductivity of 0.2 W/m·k), a ceramic material (having a thermal conductivity of 1.5 W/m·k), a carbon steel (having a thermal conductivity of 50 W/m·k), an aluminum material (having a thermal conductivity of 230 W/m·k), etc. Further, the first embodiment is in the 3-serial connection such that the heat dissipating member 30 is formed with conductivity in order to electrically connect a space between the unit cell layers 20. On the other hand, as for the non-bipolar type battery structure 11 explained below and shown in FIG. 4), a heat dissipating member is formed with an insulating property in considering the connecting type thereof.

In particular, the heat dissipating member 30 is formed by crimping graphite on a sheet material consisting of a metal material in order to improve conductivity or heat dissipating property. Alternatively, the heat dissipating member 30 may be formed from materials in which carbon filler is dispersed into resin such as polypropylene, polyethylene, polyethylene terephthalate, etc. More specifically, the heat dissipating member can be formed from a conductive rubber sheet in which conductive filler such as graphite is dispersed into a composite rubber or a sheet type material wherein the carbon filler is dispersed into polyethylene. The material in which the carbon filler is dispersed into the resin has superior thermal conductivity such that the heat dissipating property or vibration absorbing property is superior. Further, when stacking the heat dissipating members 30, there are convex and concave configurations formed between the layers when observing microscopically. The absorbing effect of the convex and concave configurations is obtained so as to reduce contact resistance.

Also, the thickness of the heat dissipating member 30 can be, for example, from 0.01 to 1 mm. This is because when the thickness of the heat dissipating member 30 is equal to or less than 0.01 mm, it is difficult to sufficiently secure the heat dissipating property. Further, when the thickness is equal to or greater than 1 mm, this is not as desirable when considering the vibration absorbing property.

In the battery structure 10 constructed in accordance with the first embodiment, three cell elements 40a, 40b and 40c are stacked by using the two heat dissipating members 30. However, the number of layers of the heat dissipating members 30 can be appropriately changed depending on the object or circumstance of use. For example, when mounted in a vehicle, the frequency of vibration of the battery structure received from a top portion of the vehicle is within a range approximately equal to or less than 100 Hz, When the natural frequency (resonance frequency) of the battery structure 10 exists in such a frequency range, the battery structure 10 is likely to resonate such that an interlayer delamination between the elements of the battery structure 10 occurs. This causes an internal short circuit to thereby reduce the power or service life of the battery. Therefore, a disposing structure or the number of layers of the heat dissipating member 30 of the battery structure 10 may be appropriately changed in order to deviate from such a vibration range.

Further, as shown in FIG. 2, when the battery structure 10 includes the covering material 50 (the detailed description thereof is explained below), a part of the heat dissipating member 30 must contact the covering material 50. By doing so, the inside of the covering material 50 can be prevented from being filled with heat released from the heat dissipating member 30. In such a case, the covering material 50 is made from a material having a heat dissipating property. The heat dissipating member 30 is also made from a material having conductivity in this embodiment in order to electrically connect a space between the unit cell layers 20. Accordingly, as will be explained below in the detailed discussion of the covering material, the covering material 50 should exhibit an electric insulating property without transmitting any electrolytic solution or gas. The covering material 50 should also be made from a material chemically stable even when the electrolytic solution exists therein. Further, a part of the heat dissipating member 30 merely contacts the covering material 50. Alternatively, they may be bonded by an adhesive consisting of a material with heat dissipating property.

Next, the unit cell layer 20 (constituting the cell elements 40a, 40b and 40c) and each element (constituting the unit cell layer 20) is explained below in detail.

The unit cell layer 20 is formed by stacking a cathode active material layer 23 formed on a surface of one collector 21, a separator 27 for maintaining an electrolyte and an anode active material layer 25 formed on a surface of another collector 21. The unit cell layer 20 constitutes the cell elements 40a, 40b and 40c. In the first embodiment, the unit cell layer 20 is formed by stacking the bipolar-type electrode including a cathode having the cathode active material layer 23 formed on one side of the collector 21 and an anode having the anode active material 25 formed on another side via the separator 27 and by stacking the cathode active material layer 23, the separator 27 and the anode active material layer 25 in that order.

Further, a sealing portion 70 for insulating a space between the adjacent collectors 21 is disposed on an outer periphery of the unit cell layer 20. Also, a surface of the collector 21 (on which the cathode active material layer 23 is formed) is referred to as a cathode, while a surface of the collector 21 (on which the anode active material layer 25 is formed) is referred to as an anode.

In the bipolar-type electrode, the cathode active material layer 23 is formed on one surface of the collector 21 and the anode active material layer 25 is formed on another surface of the collector, as mentioned above. However, in the outermost collectors 21a and 22b, any one of the cathode active material layer 23 (cathode side outermost collector 21a) and the anode active material layer 25 (anode side outermost collector 21b) can be only formed on either one surface thereof. The outermost collectors 21a and 21b are types of the bipolar-type electrode.

As shown in FIG. 2, when the length of a shorter side of a cathode active material contact area of the cathode active material layer 23 and the collector 21, or an anode active material contact area of the anode active material layer 25 and the collector 21 (hereinafter, the cathode active material contact area and the anode active material contact area are referred to as a "contact area") is defined as "b" (mm), an area of the contact area A is defined as S (mm$^2$) and a thickness of the battery structure excluding the heat dissipating member 30 (hereinafter referred to as a "non-heat dissipating member battery structure") is defined as "c" (mm), the battery structure can satisfy the following formula:

$$S/c \leq b/S. \qquad (1)$$

Here, the area S of the contact area A is a substantially rectangular shape such that the area S of the contact area A can be obtained through multiplying the length "a" of a longer side of the contact area A by the length "b" of a shorter side of the contact area A. Further, the first embodiment illustrates the battery structure 10 comprising the covering material 50. The thickness of the non-heat dissipating member battery structure excluding the covering material 50 can be "c" (mm). Alternatively, for convenience sake, the thickness of the non-heat dissipating member battery structure including the covering material 50 is "c" (mm). This is because no problems occur with obtaining the benefits of the invention according to this embodiment even with the thickness of the covering material 50.

When a ratio S/c of a thickness "c" of the non-heat dissipating member battery structure with respect to the contact area A (corresponding to an electrode surface area) is smaller than a ratio b/S of an area of the contact area A with respect to a length "b" of a shorter side of the contact area A (for the battery structure mounted in a vehicle in particular) by a balance in the thickness of the non-heat dissipating member battery structure with regard to the area S of the contact area A, it is possible to rapidly dissipate heat under charging/discharging by a high current as well as to increasingly absorb the vibration received from an upper portion of a vehicle. As such, the heat dissipating property and the vibration absorbing property of the battery structure can be improved by controlling the area of the contact area A, the length of a shorter side of the contact area A, the ratio of the contact area A and the thickness of the non-heat dissipating member battery structure in order to satisfy the above formula (1).

Further, in order to improve the heat dissipating property and the vibration absorbing property of the battery structure, the contact area A can be limited as explained below.

In this embodiment, a length L of the outer periphery of the contact area A is equal to or greater than 130 times thickness "c" of the non-heat dissipating member battery structure, and more preferably 300 to 2000 times the thickness "c". When the length L of the outer periphery of the contact area A is equal to or greater than 130 times thickness "c" of the non-heat dissipating member battery structure, the heat dissipating property can be sufficiently secured. In particular, when the length L of the outer periphery of the contact area A is 300 to 2000 times of a thickness "c" of the non-heat dissipating member battery structure, the heat dissipating property and rigidity can be secured, and the vibration absorbing property may be improved as well. Further, the length L of the outer periphery of the contact area A can be obtained by using the formula L=2a+2b.

Also, the length L of the outer periphery of the contact area A can be from 750 to 1450 mm, while the thickness "c" of the non-heat dissipating member battery structure is from 2 to 10 mm (more preferably 4 to 8 mm). In considering securing rigidity, it has been found beneficial that the length L of the outer periphery of the contact area A is equal to or less than 1450 mm, and the thickness "c" of the non-heat dissipating member battery structure is equal to or greater than 2 mm. When considering the heat dissipating property, it has been found beneficial that the length L of the outer periphery of the contact area A is equal to or greater than 750 mm and the thickness "c" of the non-heat dissipating member battery structure is equal to or less than 10 mm.

Further, a length "d" of a diagonal line of the contact area A is from 260 to 550 mm in this embodiment. When considering the heat dissipating property, it has been found beneficial that the length "d" of the diagonal line of the contact area A is equal to or greater than 260 mm. When considering securing rigidity, it has been found beneficial that the length "d" is equal to or less than 550 mm. When the length "t" of the diagonal line of the contact area A is not limited, it is also possible to provide an excessively elongate battery structure simply by defining the length L of the outer periphery of the contact area A as mentioned above. Although the benefits of the invention can be achieved with such a battery structure, it is more preferable to have a rectangular shape in order to improve the heat dissipating property or the vibration absorbing property.

The collectors 21 and the outermost collectors 21a and 21b are made from a conductive material such as aluminum foil, copper foil, stainless steel foil (SUS), etc. Such a material may be used in a single layer or multiple layers. Alternatively, a clad material covered with such a conductive material may be used. The above-mentioned material has a superior corrosion resistance, conductivity or productivity.

The collectors 21 (including outermost collectors 21a and 21b) can be from 5 to 20 μm, more preferably 8 to 15 μm, and most preferably 10 to 15 μm. It has been found to be beneficial when the thickness of the collector 21 is equal to or greater than 5 μm when considering rigidity. Further, it has been found to be beneficial when the thickness of the collector is equal to or less than 20 μm when considering the heat dissipating property.

The cathode active material layer 23 includes a cathode active material. As for the cathode active material, a composite oxide of lithium and transition metal, a transition metal oxide, a transition metal sulfide, $PbO_2$, AgO or NiOOH may be used. As for the compound of the transition metal and lithium, it is preferred to use a Li—Mn-based composite oxide such as spinel $LiMn_2O_4$, a Li—Co-based composite oxide such as $LiCoO_2$, a Li—Ni-based composite oxide such as $LiNiO_2$, a Li—Fe-based composite oxide such as $LiFeO_2$, a phosphate compound of a transition metal and lithium such as $LiFePO_4$ or a sulfated compound of a transition metal and lithium. The transition metal oxide is, for example, $V_2O_5$, $MnO_2$, $MoO_3$, etc. The transition metal sulfide is, for example, $TiS_2$, $MoS_2$, etc.

It is preferable to use a Li—Mn-based composite oxide for the cathode active materials. This is because when using the Li—Mn-based composite oxide, a portion parallel to a charging/discharging time axis of a charging/discharging curve, which can be obtained from the graph of a voltage charging/discharging time, can be declined such that the state of charging (SOC) of the battery can be estimated by measuring the voltage. As a result, an over-charging or over-discharging can be instantly detected and controlled such that the reliability can be increased when abnormalities occur.

It is preferred that an average particle size of the cathode active material is equal to or less than 10 μm, and more preferably equal to or less than 2 μm. This is because when the average particle size of the cathode active material is equal to or less than 10 μm, an electrode resistance can be reduced. Further, when the average particle size of the cathode active material is equal to or less than 2 μm, the surface of the cathode active material layer can be uniform even when the thickness of the cathode active material layer 23 becomes thinner.

Additionally, it is preferred that the average particle size of the cathode active material is equal to or less than one-tenth of the thickness of the separator. This is because when the average particle size of the cathode active material is equal to or less than one-tenth of the thickness of the separator, the risk of the cathode active material passing through the separator to cause a micro short circuit can be reduced.

The anode active material layer 25 includes an anode active material. The anode active material may comprise at least one of the materials consisting of a crystalline carbon material, a non-crystalline carbon material, a metal oxide such as TiO, $Ti_2O_3$, $TiO_2$, etc. and a composite oxide of lithium and transition metal such as $Li_{4/3}Ti_{5/3}O_4$.

It is preferable to use the crystalline carbon material or non-crystalline carbon material for the anode active materials, and more preferably the non-crystalline carbon material. When using the crystalline carbon material or non-crystalline carbon material, a portion parallel to the time axis of a charging/discharging curve, which can be obtained from the graph of a voltage charging/discharging time, can be declined such that the state of charging (SOC) of the bipolar-type battery can be estimated by measuring the voltage. As a result, an over-charging or over-discharging can be detected and controlled such that the reliability can be increased when abnormalities occur.

It is preferred that the average particle size of the anode active material is equal to or less than 10 μm, and more preferably equal to or less than 2 μm. This is because it is preferred when the average particle size of the anode active material is equal to or less than 10 μm when considering reducing the electrode resistance. Further, when the average particle size of the anode active material is equal to or less than 2 μm, the surface of the cathode active material layer can be uniform even when the thickness of the anode active material layer 25 becomes thinner. In addition, it is preferred that the average particle size of the anode active material is equal to or less than one-tenth of the thickness of the separator, as explained below. This is because when the average particle size of the anode active material is equal to or less than one-tenth of the thickness of the separator, the risk of the anode active material passing through the separator to cause a micro short circuit can be reduced.

The separator 27 retains an electrolyte, which is described in detail hereinafter, and forms an electrolyte layer.

It is preferred that a shore-A hardness (hereinafter referred to as "hardness") of the separator 27 is from 20 to 110. In order to improve the vibration absorbing property of the battery structure, it is preferred that the hardness of the separator may be set such that the separator has a slight viscoelastic property. In particular, when the battery structure 10 is mounted in a vehicle, in case the hardness of the separator 27 is equal to or greater than 20, it is difficult for the resonance frequency to be transferred to a low frequency side such that it can prevent from reaching the resonance frequency (approximately equal to or less than 100 Hz). Further, when the hardness of the separator 27 is equal to or less than 110, the separator can appropriately absorb the vibration to improve the vibration absorbing property.

Additionally, when the separator having such hardness is used, a space between two electrode layers (cathode and anode) can be evenly maintained. As a result, the possibility wherein a space between the electrodes is closely in contact due to the vibration from the outside to thereby cause a short circuit can be significantly reduced. Consequently, a separator that is thinner than a conventional separator can be used. A method of measuring the hardness of the separator can be based on the method provided in JIS-K-6253.

In addition, the hardness of the separator 27 of at least one unit cell layer 20 differs from the hardness of the separator 27 of another unit cell layer 20 according to some embodiments.

Also, the hardness of the separator 27 may be gradually increased from the separator 27 in the unit cell layers 20c and 20d positioned at the center of the battery structure 10 towards a unit cell layer 20 (uppermost unit cell layer 20a and lowermost unit cell layer 20b) positioned at both ends in a stacking direction. More specifically, according to certain embodiments of the invention, the hardness of the separator 27 in the unit cell layer 20a (or unit cell layer 20b) is greater than the hardness of the separator 27 in the unit cell layer 20c (or unit cell layer 20d). Further, when a group of unit cell layers 20 (a set of four unit cell layers 20) in the cell elements 40a, 40b and 40c is considered as a single unit cell layer, the hardness of the separator in the unit cell 40a (or unit cell 40b) can be greater than the hardness of the separator in the unit cell 40c (or unit cell 40d). Moreover, the layer positioned at the center of the battery structure may be one or more unit cell layers.

The reason for using separators 27 with different hardness values is as follows.

FIG. 3 illustrates a model of a vibration system (mass-spring-damper system) of the battery structure 10. As shown therein, the cell element consisting of the unit cell layer 20 and the collector 21 is modeled as the vibration system consisting of a mass 320, springs 311 and 313 and dampers 315 and 317.

In the embodiment shown, the mass 320 is formed from the bipolar-type electrode (wherein the cathode active material layer 23 is formed on one surface of the collector 21 and the anode active material layer 25 is formed on another surface). The tuning of the mass 320 can be performed by changing the thickness of the cathode active material layer 23, the thickness of the anode active material layer 25 or the thickness of the collector 21.

Here, when a spring constant $K_2$ of the separator 27b is smaller than a spring constant $K_1$ of the separator 27a ($K_1 > K_2$), and a viscous coefficient $C_2$ of the separator 27b is larger than a viscous coefficient $C_1$ of the separator 27a ($C_2 > C_1$), the inner side of the stacking direction has a higher damping property. Generally, the same materials are used for constituting the unit cell layers 20 such that when replaced with a vibration system model, the mass 320, the springs 311 and 313 and the dampers 315 and 317 become equalized. However, as mentioned above, the hardness of some separators 27 differs from that of other separators 27. More specifically, the hardness of the separator 27 is gradually increased from the separator 27 in the unit cell layer 20 positioned at the center portion of the battery structure 10 towards the unit cell layer 20 (uppermost unit cell layer 20a and lowermost unit cell layer 20b) positioned at both ends in a stacking direction. By doing so, the resonance of the battery structure 10 can be transferred to a high frequency side, and the vibration transmitting ratio at the belly portion of the battery structure 10 (around the center portion) can be reduced. As a result, the vibration absorbing property of the battery structure 10 can be further improved.

Further, the heat transfer coefficient of most materials that can be used as a separator 27 of a battery structure 10 generally tends to be increased as the hardness of the separator is decreased. As the heat transfer coefficient increases, the heat dissipating property increases. Therefore, when the hardness of the separator positioned at the center of the battery structure is lower than the hardness of the separator in the unit cell layer positioned at both ends of the stacking direction of the battery structure, a higher heat dissipating property can be provided to a central portion of the battery structure, which can be easily filled with heat. Consequently, the heat dissipating property of the battery structure can be further improved.

The separator 27 may comprise at least one resin selected from the group consisting of a polyester-based resin, an aramid-based resin, a polypropylene-based resin, a polyester-based resin including inorganic materials, a polypropylene-based resin including inorganic materials and an aramid-based resin including inorganic materials. However, the separator 27 is not limited to the above materials. When using such resins, the separator 27 can be formed in a porous structure. Further, a separator 27 having a higher heat dissipating property can be formed, as mentioned above. Also, such resins may have a superior water-proofing property, moisture-proofing property, hot/cold cycling property, heat-proofing property and insulating property. In particular, the aramid-based resin is preferably used to form a separator that is thinner.

Further, the inorganic material included in the polyester-based resin including inorganic materials, the aramid-based resin including inorganic materials and the polypropylene-based resin including inorganic materials is a fine powder or filler such as alumina, $SiO_2$, etc. The inorganic material is mixed into the polyester-based resin, the aramid-based resin and the polypropylene-based resin to improve the rigidity of the separator. Also, when starting with such inorganic materials, fine pores can be easily formed such that porosity per unit area increases and a separator with higher air permeability and tortuosity (the detailed description thereof is explained below) can be formed. It is preferred that the content of the inorganic materials of the separator is from 30 to 95 percent by mass, and more preferably 50 to 90 percent by mass.

It is preferred that the tortuosity $\gamma$ of the separator 27 is from 0.5 to 2.0. This is because although it is preferable to lower the tortuosity $\gamma$ of the separator 27 in order to increase power, when the tortuosity $\gamma$ of the separator 27 is excessively low, there is a risk that the spring constant K or viscous coefficient C of the separator 27 is reduced, and the vibration absorbing property is deteriorated. Further, when the tortuosity $\gamma$ of the separator 27 is excessively high, the power of the battery structure 10 is affected, thereby becoming difficult to be increased. Also, the tortuosity $\gamma$ should be defined as an absorbing surface area $S_1$ obtained by a general absorption method divided by a projected area thereof. $S_0$ ($\gamma=S_1/S_0$).

It is preferred that the thickness of the separator 27 is thin so that it does not lose the rigidity of each unit cell layer of the battery structure 10 (preferably 3 µm to 20 µm). When the thickness of the separator 27 is thin, the number of stacked layers of the unit cell can be increased. However, when the thickness is excessively thin, the rigidity of each unit cell layer can be lost.

The electrolyte layer includes an electrolyte. The electrolyte included in the electrolyte layer serves as a carrier of ion, which moves between the cathode and anode layers at the time of charging/discharging. The electrolyte may comprise a solid polymer electrolyte or a gel electrolyte. The solid polymer electrolyte may comprise polyethylene oxide, polypropylene oxide or copolymer thereof.

The gel electrolyte includes an electrolytic solution in a framework consisting of the polymer electrolyte. As for the framework, a solid polymer electrolyte with ion conductivity or a solid polymer electrolyte without ion conductivity may be used.

The electrolytic solution consists of electrolyte salt and plasticizer. The electrolytic salt, for example, may comprise inorganic anion salts such as $LiPF_6$, $LiBF_4$, $LiClO_4$, $LiAsF_6$, $LiTaF_6$, $LiAlCl_4$ or $Li_2B_{10}Cl_{10}$, or organic anion salts such as $Li(CF_3SO_2)_2N$ or $Li(C_2F_5SO_2)_2N$. Such an electrolytic salt may be mixed with the plasticizer either alone or in combination with other elements. The plasticizer, for example, may comprise: ring-type carbonate class such as propylene carbonate, ethylene carbonate, etc.; chain-type carbonate class such as dimethyl carbonate, methylethyl carbonate, diethyl carbonate, etc.; ether class such as tetrahydrofuran, 2-methyl tetrahydrofuran, 1,4-deoxane, 1,2-dimethoxyethane, 1,2-dibtoxyethane, etc.; lactone class such as γ-butyrolactone; nitrile class such as acetonitrile; ester class such as methyl propionate, etc.; amide class such as dimethylformamide, etc.; and ester class such as methyl acetate, methyl formate, etc. Such a plasticizer may be mixed with the electrolytic solution either alone or in combination with other elements.

The solid polymer electrolyte with ion conductivity used for the gel electrolyte, for example, may comprise polyethylene oxide, polypropylene oxide or copolymer thereof. The solid polymer electrolyte without ion conductivity used for the gel electrolyte, for example, may comprise polyvinylidene fluoride, polyvinyl chloride, polyacrylonitrile, polymethyl methacrylate, etc.

As for the gel electrolyte, it is preferred that the mass ratio of solid polymer electrolyte and electrolytic solution is 20:80 to 98:2.

The battery structure 10 may comprise the sealing portion 70 between collectors 21. The sealing portion 70 is disposed so as to surround the cathode active material layer 23, the electrolyte layer and the anode active material layer 25. This is so that when using the gel electrolyte as the electrolyte layer, the leakage of electrolytic solution can be prevented.

The sealing portion 70 can have a structure wherein a non-conductive second resin having a melting point higher than the first resin is interposed between first resins with thermal fusing property. This is so that the second resin is parallel to the collector 21 as disclosed in Japanese Laid-Open Patent Publication No. 2004-158343. As a combination of first and second resins, when considering the manufacturing process it is preferred that the first resin has a melting point equal to or less than 180° C. while the second resin has a melting point equal to or greater than 180° C. so as to be thermally fused with the first resin. Such resin, for example, may comprise polypropylene, polyethylene, polyurethane, thermal plastic olefine rubber, etc., as the first resin. Further, it may include, for example, a polyamide class resin such as nylon 6, nylon 66, polytetrafluoroethylene, polyvinylidene fluoride, polystyren, etc. or silicon rubber as the second resin. However, it should be noted that the resins are not limited to the above materials.

Next, the covering material 50 for covering the battery structure 10 is explained in detail. The covering material 50 has an electric conductivity without transmitting an electrolytic solution or gas. The covering material 50 is made from a chemically stable material that has a high capability for heat radiation even when the electrolytic solution exists inside thereof. This covering material 50 prevents any physical contact with the outside while improving the heat dissipating property.

The covering material 50, for example, is formed from a polymer material such as polyester, nylon, polypropylene, polycarbonate, etc., a metallic material such as aluminum, stainless steel, titanium, etc., or a polymer-metallic composite material. In particular, when using the polymer-metallic composite material, the thickness of a membrane can become thinner while maintaining the rigidity of the covering material 50. This is preferred when considering battery structure protection and heat dissipating property.

As for the polymer-metallic composite, it is preferred to use, for example, a polymer metallic composite film in which a thermally fusing resin (e.g., polyethylene, ethylenevinylacetate, ionomer resin) film, metal foil (e.g., foil made from aluminum, nickel, stainless steel, copper or alloy thereof), resin film with good rigidity (e.g., polyethylene terephthalate film and nylon) are stacked in the above-introduced order. When the covering material 50 is formed from such a film, it is possible to easily transform the film such that hydrostatic pressure can be applied. Further, since the metal foil exists, the pressure difference between the inside and outside of the covering material 50 can be maintained by reducing gas permeability.

The battery structure constructed as mentioned above can solve the conventional problems associated with the heat dissipating property or vibration absorbing property caused when the surface area of electrode is large (approximately A5 to A2 size) and the thickness of battery structure is equal to or greater than 10 mm. In other words, the battery structure disclosed can achieve the same level of heat dissipating property as a conventional thin battery structure (having a thickness of 3 to 10 mm) due to the heat dissipating and vibration absorbing effects of the heat dissipating member. This is true even when the surface area of the electrode is large (approximately A5 to A2 size) and the thickness of the battery structure is equal to or greater than 10 mm. Further, the vibration absorbing property can be improved compared to the conventional battery structure. As a result, a battery structure with high capacity or high power can be provided.

Figure 4:
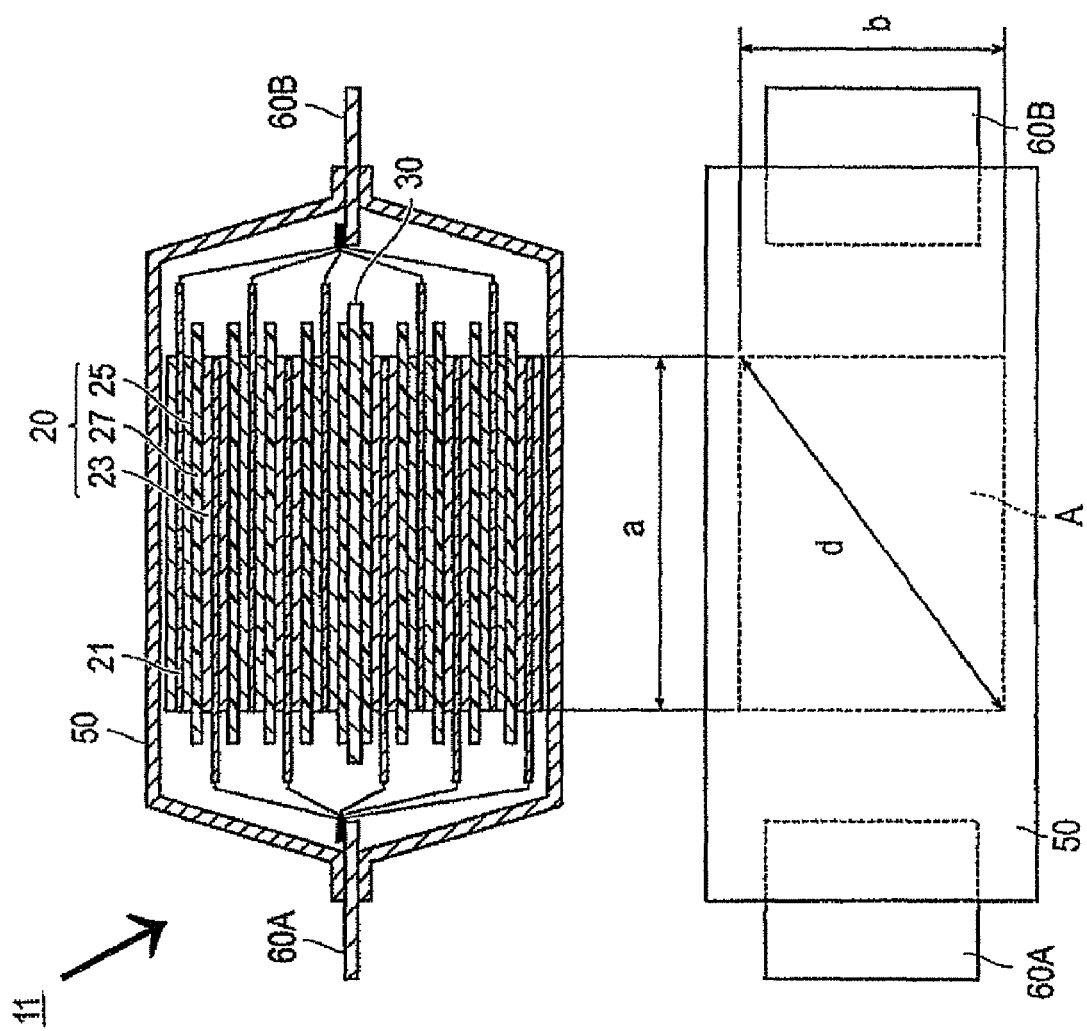
FIG. 4 is a schematic view illustrating an inner structure of a battery structure constructed in accordance with a second embodiment of the invention.

In the first embodiment, a bipolar-type battery structure has been explained. However, embodiments of a battery structure taught herein also encompass a staking-type battery structure 11 such as a general lithium ion battery. FIG. 4 is a schematic view illustrating the inner structure of the stacking-type battery structure 11, which differs from the bipolar-type battery structure 10 in terms of connection with the electrode layer. Further, each feature of the battery structure 11 shown in FIG. 4 is identical to those of the battery structure 10 shown in FIG. 1. Thus, their explanations will be omitted herein. Also, in FIG. 4, like reference numerals designate like features shown in FIG. 1.

The appearance of the stacking-type battery structure 11, which is shown in FIG. 4, is the same as that of the battery structure 10 shown in FIG. 1. The top portion of FIG. 4 illustrates a cross-sectional view taken along the line II-II shown in FIG. 1 while the bottom portion of FIG. 4 illustrates a schematic plan view of the battery structure 11 shown in FIG. 1.

Referring to FIG. 4, the unit cell layer 20 constituting the battery structure 11 is formed by providing an electrolyte layer 27 (corresponding to the separator 27 shown in FIG. 1) between the collector 21 in which the cathode active material layer 23 is disposed at both sides thereof and the collector 21 in which the anode active material layer 25 is disposed at both sides thereof. At the center portion of the battery structure 11, a heat dissipating member 30 is provided between the electrolyte layers (separators) 27. However, the disposing make-up of the electrode layer of the battery structure 11 of this embodiment differs from that of the battery structure 10 of the first embodiment. Thus, it is necessary to allow the heat dissipating member 30 to possess insulating property.

Further, the covering material 50 is spaced apart from the heat dissipating member 30. The portion facing the depth direction (upper-lower direction in the lower portion of FIG. 4) from a surface of the heat dissipating member 30 contacts the covering material 50. Also, the width of the heat dissipating member 30 contacting the covering material is narrow in the stacking direction (upper-lower direction in the top portion of FIG. 4), whereas it is quite wide in the depth direction from the surface shown in the top portion of FIG. 4. As such, heat from the heat dissipating member 30 can be sufficiently dissipated to the outside.

The general lithium ion battery in the configuration of the stacking-type battery structure 11 of this second embodiment has high battery capacity and energy type. Its performance for continuously supplying electrical power over a long period is superior. On the other hand, the bipolar-type battery in the configuration of the bipolar-type battery structure 10 of the first embodiment has a high power density. Its performance for supplying a large amount of electrical power over a short period is superior. Accordingly, the configuration to be adopted can be appropriately selected depending on the configuration of the required electrical power. For example, when being used as a power source for driving a motor of a vehicle, the battery structure according to embodiments of the invention is preferably a bipolar-type battery having a bipolar-type battery structure so as to achieve high output density.

Figure 5A:
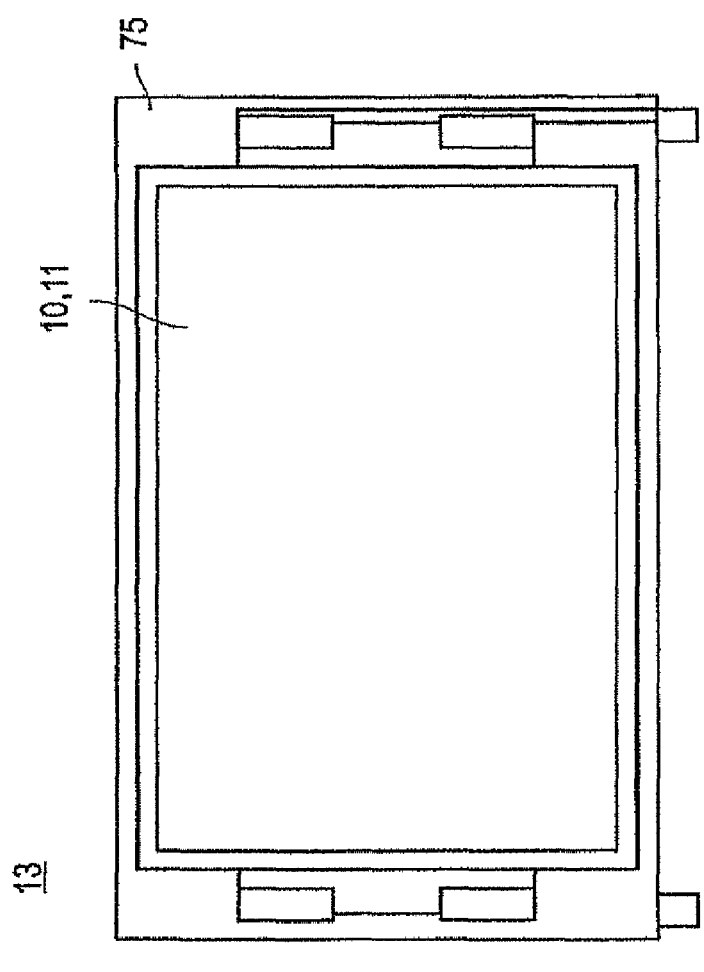
Figure 5C:
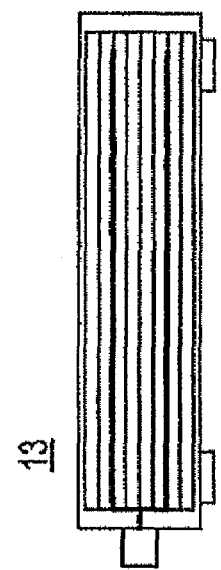
Figure 5B:
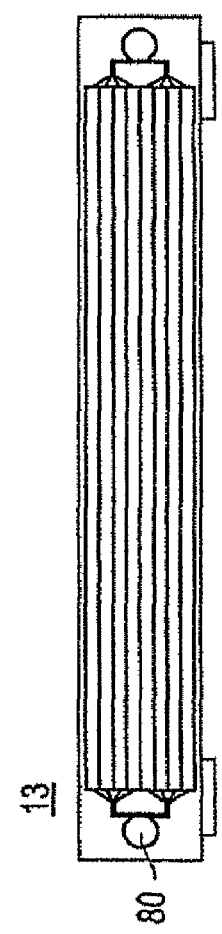

The battery structures 10, 11 as explained above can form a battery assembly module by connecting a plurality of battery structures in series or in parallel. FIG. 5 illustrates a schematic of a battery assembly module 13 in which the battery structures 10 and 11 shown in FIG. 2 or FIG. 4 are contained in a case 80 according to a third embodiment of the invention. FIG. 5A illustrates a plan view of the battery assembly module 13, whereas FIG. 5B illustrates a front view of the battery assembly module 13. FIG. 5C illustrates a side view of the battery assembly module 13.

As shown in FIG. 5, portions of the prepared battery assembly module 13 can be connected to each other by using an electrically connecting means such as a busbar 80.

A battery assembly 15 can be formed by further connecting a plurality of battery assembly modules 13 of the third embodiment in series or in parallel to form a fourth embodiment of the invention.

FIG. 6 illustrates a battery assembly 15 that connects the battery assembly modules 13 shown in FIG. 5 in 6-parallel connections. FIG. 6A illustrates a plan view of the battery assembly 15, whereas FIG. 6B illustrates a front view thereof. Further, FIG. 6C illustrates a side view of the battery assembly 15.

As shown in FIG. 6, the battery assembly 15 is formed by stacking a plurality of battery assembly modules 13 by using a connecting jig 85. A vibration absorbing structure can be formed by installing an elastic body 90 between the battery assembly modules 13. Depending on the battery capacity or power of a vehicle (electric vehicle) to be mounted, it can be decided how the battery structures 10 and 11 should be connected to preparation of the battery assembly module and further how many layers of battery module 13 should be stacked to prepare the battery assembly.

As such, the battery assembly made by connecting the plurality of battery assemblies 13 in series and in parallel can have high capacity or power. Further, since each battery assembly module 13 is highly reliable, it is possible to maintain the battery assembly 15 in a reliable state for a long time. Also, in the event that some of the battery assembly modules fail, the repair can be performed simply by replacing only the failed components.

Figure 7:
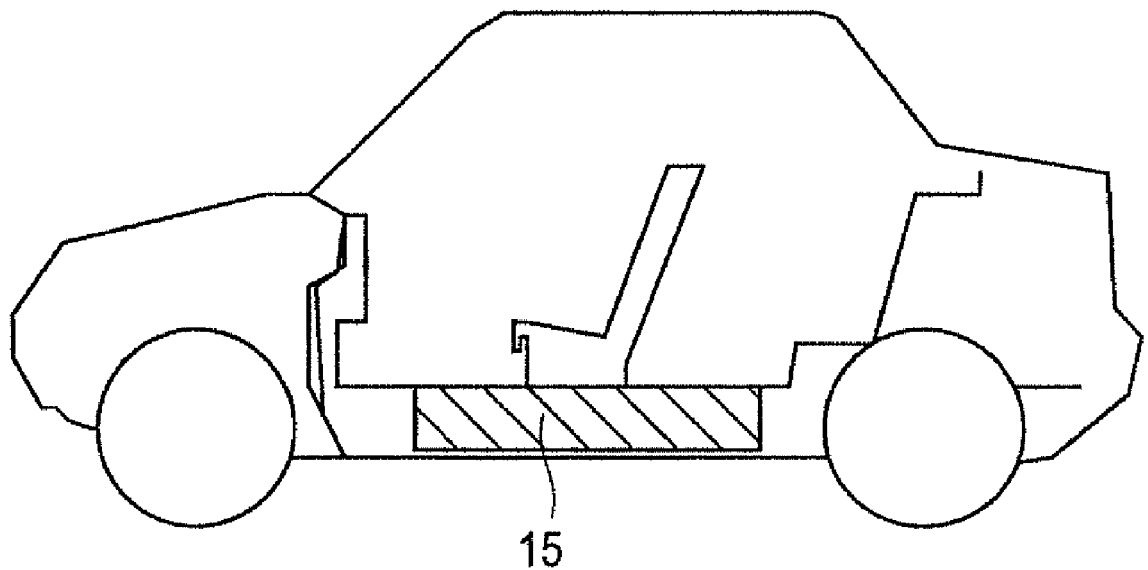
FIG. 7 illustrates a battery assembly mounted in a vehicle.

In order to mount the battery assembly 15 in the electric vehicle 100, as shown in FIG. 7, the battery assembly 15 is mounted under the seat of a center portion of the vehicle body. When the battery assembly is mounted under the seat, there can be provided a larger space within the vehicle and trunk room. Further, the battery assembly 15 can be mounted at other locations besides under the seat. Alternatively, the battery assembly 15 may be mounted on a lower portion of the trunk room at the rear of the vehicle or at an engine compartment disposed at the front of the vehicle. The electric vehicle using such a battery assembly 15 can have higher durability and provide sufficient power even over a long-term use. Also, an electric vehicle and a hybrid vehicle can achieve a superior running performance and the fuel consumption can be decreased by weight reduction.

Hereinafter, the battery structure is explained in detail based on one embodiment. A method of manufacturing the battery structure in the present examples and comparative examples are explained below.

First, a method of manufacturing a battery structure in a bipolar type (hereinafter referred to as "bipolar type battery structure") of the examples and comparative examples is explained below in detail. Further, the battery structure covered with a laminate material (corresponding to the covering material) is prepared in Examples 5 to 21 and Comparative Examples 5 to 12. The battery structure without the laminate material is prepared in Examples 22 to 24 and Comparative Example 13 or 14 (conventional battery structure). Also, the battery structure wherein the heat dissipating member is not interposed is described in Comparative Examples 5 to 12. A single heat dissipating member made from various materials shown in Table 1 is stacked on each layer of the electrode layer 10. As for the battery structure not being characterized by ten layers, the heat dissipating member is established between the unit cell layers at an approximate center portion of overall layers of the battery structure.

A method of manufacturing the bipolar type battery structure, which becomes the base of Examples 5 to 24 and Comparative Examples 5 to 14, is the same. Therefore, the method of manufacturing the bipolar type battery structure is explained in Example 11.

First, as an electrode layer, a SUS foil having a thickness of 15 μm is used as a collector. Then, a cathode active material layer (cathode side) is prepared by applying Li—Mn-based $LiMnO_2$ (average particle size of 2 μm) having a thickness of 10 μm to one side of the SUS foil as a cathode active material. Thereafter, an anode active material layer (anode side) is prepared by applying hard carbon (an average particle size of 6 μm) of crystalline carbon material having a thickness of 15 μm to another side of the SUS foil (opposite side where the cathode active material layer is applied) as an anode active material. An outermost collector is manufactured wherein the above cathode active material layer is formed on one side, while the above anode active material layer is formed on another side using the above-described SUS foil. The electrode layers are prepared to form an A4 size.

Next, an electrolyte layer is prepared by immersing PVdF, which is a precursor of an additional cross-linked gel electrolyte, into a polyester non-woven fabric separator (thickness of 20 μm: Shore A Hardness of 61).

Then, the heat dissipating member ("carbon steel+carbon" in Table 1) is manufactured by applying an extremely small quantity of conductive paste having low viscosity to both sides of carbon steel sheet (thickness of 0.1 mm), which contains about 1 wt % of carbon. Thereafter, the steps of compressing and bonding graphite powder to an average particle size of 5 μm are performed.

Next, the battery structure is stacked in a desired stacking number, while disposing the heat dissipating member between the unit cell layers consisting of the cathode active material layer, the separator and the anode active material layer. In addition, an Al tab (thickness of 100 μm and width of 100 mm) is vibration-deposited to the cathode side of the outermost collector. Further, a Cu tab (thickness of 100 μm and width of 100 mm) is vibration-deposited to the anode side of the outermost collector.

Then, the battery structure is covered and sealed with a laminate material, which is structured with three layers of a maleic acid modified polypropylene film as a thermally fusing resin film, a SUS as a metallic foil and nylon-aluminum-modified polypropylene as a resin film having rigidity.

Next, the bipolar type battery structure is prepared by heating and cross-linking in 80° C. for two hours.

A method of manufacturing a non-bipolar type battery structure (hereinafter referred to as "stacking type battery structure") used in the examples and the comparative example is explained below in detail. Further, the battery structure covered with the laminate material (corresponding to the covering material) is prepared in Examples 1 to 8 and Comparative Examples 1 to 4. The battery structure in which the heat dissipating member is not interposed is prepared in Comparative Examples 1 to 4. In addition, a single heat dissipating member having the specifications shown in Table 1 is stacked at every ten layers. In the battery structure not being characterized by ten layers, the heat dissipating member is established between the unit cell layers at an approximate center portion of overall layers of the battery structure.

A method of manufacturing the stacking type battery structure, which becomes the base of Examples 1 to 8 and Comparative Examples 1 to 4, is the same. Thus, the method of manufacturing the bipolar type battery structure is explained in Example 2.

First, a cathode active material layer (cathode layer) is prepared by using an aluminum foil in a thickness of 15 μm as a collector and applying Li—Mn based $LiMnO_2$ (average particle size of 2 μm) to both sides of the aluminum foil as a cathode active material in a thickness of 10 μm. An anode active material layer (anode layer) is prepared by using a copper foil in a thickness of 15 μm as a collector and applying hard carbon (having an average particle size of 6 μm) of crystalline carbon material to both sides of the copper foil as an anode active material in a thickness of 15 μm.

Next, an electrolyte layer is prepared by immersing a precursor of an additional cross-linked type gel electrolyte into a polyester non-woven fabric separator (thickness of 20 μm: Shore A Hardness of 61). The electrode layers are prepared so as to possess an A4 size.

Then, the heat dissipating member (t"ceramics" in Table 1) is manufactured by applying an extremely small quantity of conductive paste having low viscosity to both sides of a ceramics sheet (thickness of 0.1 mm), which mainly consists of alumina. Thereafter, the steps of compressing and boding graphite powder in an average particle size of 5 μm are performed.

Next, the battery structure is stacked in a desired stacking number, while interposing the heat dissipating member as mentioned above between the unit cell layers consisting of the cathode active material layer, the separator and the anode active material layer. In addition, an Al tab (thickness of 100 μm and width of 100 mm) is vibration-deposited on the cathode side of the outermost collector. Further, a Cu tab (thickness of 100 μm and width of 100 mm) is vibration-deposited on the anode side of the outermost collector.

Then, the battery structure is covered and sealed with a laminate material, which is structured with three layers of a maleic acid modified polypropylene film as a thermally fusing resin film, a SUS as a metallic foil and nylon-aluminum-modified polypropylene as a resin film having rigidity.

Next, the bipolar type battery structure is prepared by heating and cross-linking in 80° C. for two hours.

Also, as the heat dissipating member, Examples 9 to 12 use "carbon steel+carbon" while Examples 1 to 8 use "ceramics." Meanwhile, Examples 13 to 15 use a heat dissipating member manufactured by applying an extremely small quantity of conductive pates having low viscosity to both sides of aluminum sheet (thickness of 0.1 mm). Thereafter, the steps of compressing and bonding graphite powder having an average particle size of 5 μm ("aluminum+carbon" in Table 1) are performed. Examples 16 and 19 to 24 use a heat dissipating member manufactured by dispersing carbon materials as a conductive filler to polyethylene ("PE+carbon" in Table 1). Example 17 uses a heat dissipating member manufactured by dispersing carbon materials as a conductive filler to rubber materials ("rubber+carbon" in Table 1).

Table 1 shows a length "a" (mm) of a longer side of the prepared electrode layer (cathode active material layer contact area or anode active material layer contact area), a length "b" (mm) of a shorter side of the electrode layer, a thickness "c" of the battery structure (thickness excluding the heat dissipating member when the battery structure in which the heat dissipating member is interposed), an outer periphery L of the electrode layer, an area S of the electrode and a diagonal line T of the electrode.

Next, the measurement of a vibration damping ratio is discussed.

An acceleration pickup was installed at the center of a unit cell element obtained by the method of Examples 1 to 31 and Comparative Examples 1 to 10. Further, a vibration spectrum of the acceleration pickup when hammered with an impulse hammer was measured. The method is in accordance with JIS-B-0908 (Methods for calibration of vibration and shock pick-ups: Basic concept). Thus, the measured spectrum was analyzed by using a FFT analyzer and converted to the dimensions of frequency and acceleration. Such obtained frequency was averaged and smoothed to obtain a vibration transmissibility spectrum. These acceleration spectra in the range of 10 to 300 Hz were averaged to obtain an average vibration value.

Among the comparative examples of the same size of the electrode layer, the comparison standard uses the thickest option. More specifically, the comparison standard of Examples 1 to 4 corresponds to Comparative Example 1, while that of Examples 5 to 8 corresponds to Comparative Example 3. Further, the comparison standard of Examples 9 to 12 corresponds to Comparative Example 5, while that of Examples 13 to 15 corresponds to Comparative Example 7, The comparison standard of Examples 16 to 18 corresponds to Comparative Example 9, while that of Examples 19 to 21 corresponds to Comparative Example 11. In addition, the comparison standard of Examples 22 to 24 corresponds to Comparative Example 13. The spectrum of each standard is allowed to be a vibration average, while the ratio of each standard to the vibration average is allowed to be an average damping amount.

The vibration damping ratio is a ratio of the average vibration value in each Example to each standard value. In other words, the vibration damping ratio is obtained by the average vibration value of the example×100/the average vibration value in the comparative example. A vibration damping ratio of 0% indicates that the average vibration value in the example was the same as that of the comparative example and further that no vibration damping has occurred. A vibration damping ratio of 30% indicates that the average vibration value in the example was reduced to 30% compared to that in the comparative example.

Further, each standard uses a comparative example having the same area of the electrode. Specifically, the comparison standard of Examples 1 and 2 corresponds to Comparative Example 4, while that of Examples 3 to 6 and 14 corresponds to Comparative Example 5. Further, the comparison standard of Examples 7 to 9 corresponds to Comparative Example 6, while that of Examples 10 to 12 corresponds to Comparative Example 7.

Figure 8:
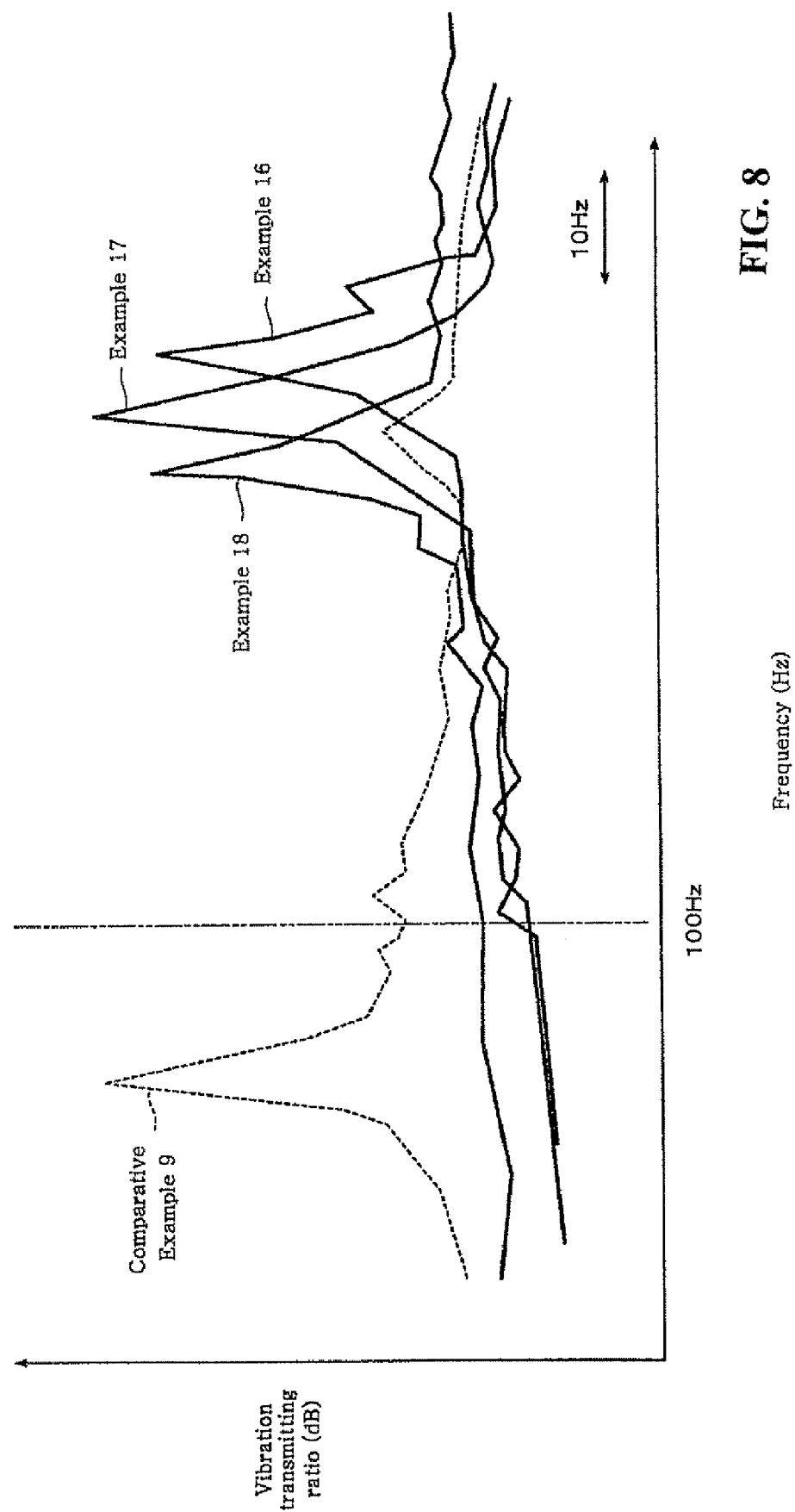
FIG. 8 is a graph illustrating the comparison of a vibration absorbing performance between an example and a comparative example of the invention.

FIG. 8 illustrates a graph showing the vibration transmissibility and frequency of Examples 15, 16 and 17 as well as Comparative Example 9. Table 1 shows the vibration damping ratio of each example as well as the primary resonance peak (maximum peak frequency in the lowest frequency side) of each example and comparative example.

FIG. 8 illustrates the vibration transmissibility and frequency of Examples 16, 17 and 18 as well as Comparative Example 9. As explained above, the vibration occurring in a vehicle is generally equal to or less than approximately 100 Hz. When the primary resonance frequency of the battery structure is within such a range, the battery structure resonates in the vehicle. Referring again to FIG. 8, the primary resonance peak is equal to or less than 100 Hz in Comparative Example 5. Further, it should be understood that the primary resonance peak in Examples 16, 17 and 18 is at a higher frequency than 100 Hz such that the resonance has not been reached in the vehicle. Also, as to the column for the primary resonance peak in Table 1, it should be understood that the primary resonance in the examples, which are not shown in FIG. 8, is at a higher frequency than 100 Hz. Also, as shown in Table 2, it should be understood that from the column for the vibration damping ratio, the vibration average value in each example is reduced. From the above, the vibration absorbing property of the battery structure of the present invention is superior to that of the conventional battery structure.

Next discussed is heat increase and measurement of the heat dissipating time.

The battery structures obtained in the methods of Examples 1 to 24 and Comparative Examples 1 to 14 were subjected to a 10C cycle test for 60 minutes. The maximum temperature reached among average temperatures at the center portion of a battery structure was measured during the test for obtaining the difference from a temperature before the test, which was referred to as "heat increase." After 60 minutes, the current was cut off, and the battery structure was left standing at room temperature. The time required for the battery structure to return to the room temperature was measured and is referred to as "heat dissipation time." The temperature of a laminated structure cell was measured using a thermocouple attached to the edge of the foil located at the center of the cell. The 10C cycle test for 60 minutes means a test where 6 minute charge and 6 minute discharge are alternately repeated five times at a current value of 10C.

Table 2 illustrates the heat increase and the heat dissipating time of each example and comparative example. The heat dissipating time measurement is performed for 60 minutes, and when the temperature is not returned to a room temperature, it is indicated as being "equal to or greater than 60." From the heat increase column in Table 2, when comparing each comparative example to each example, it should be understood that in each example it is difficult for the temperature inside the battery structure in use to increase. Further, referring to the heat dissipating time column in Table 2, the average temperature at the center portion does not decrease to the room temperature after 60 minutes in each comparative example, whereas the average temperature at the center portion decreases to the room temperature at least within 20 minutes in each example.

Figure 9:
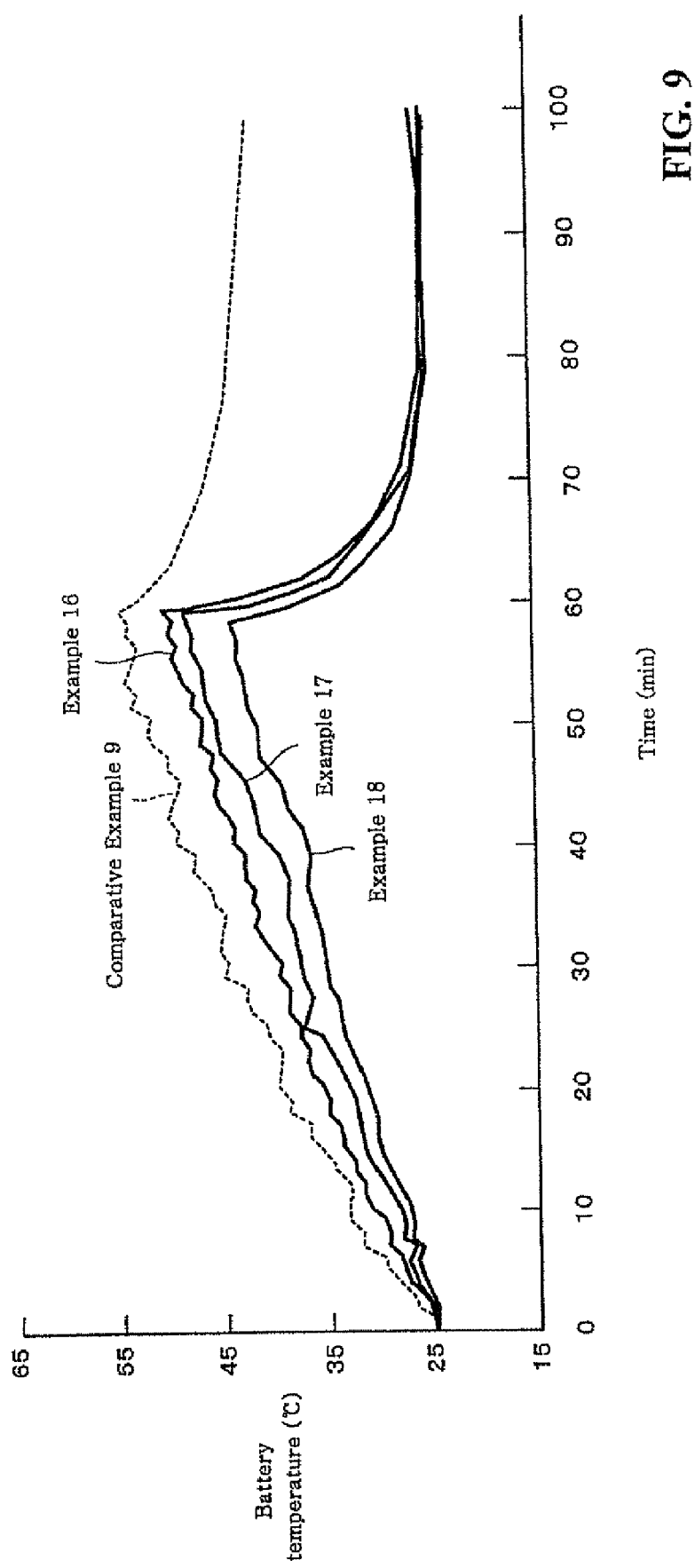
FIG. 9 is a graph illustrating the comparison of a heat dissipating property between an example and a comparative example of the invention.

FIG. 9 illustrates the heat dissipating property of Examples 16, 17 and 18 as well as Comparative Example 9. From FIG. 9, it should be understood that the slope of a battery temperature-time curve is small during 0 to 60 minutes when a 10C cycle test has been performed in each of Examples 16 to 18. After 60 minutes, the slope becomes larger such that it is difficult for the temperature inside the battery structure of the examples to increase compared to the comparative examples. From the above, it can be understood that the heat dissipating property of the battery structure of the present invention is superior to that of the conventional battery structure.

TABLE 1

| | $\frac{S}{c \times 1000} = H1$ | $\frac{b \times 1000}{S} = H2$ | L/C | H1/H2 | H1 ≤ H2 | 130 ≤ L/C | 300 ≤ L/C ≤ 2000 | 750 ≤ L ≤ 1450 | 260 ≤ d ≤ 550 | Heat Increase (ΔT) | Heat dissipating time (min) | Primary resonance peak (Hz) | Vibration damping ratio (%) |
|---|---|---|---|---|---|---|---|---|---|---|---|---|---|
| Example 1 | 0.8 | 13.3 | 50 | 0.1 | ○ | × | × | × | × | 26 | 20 | 200 | 35 |
| Example 2 | 3.8 | 13.3 | 250 | 0.3 | ○ | ○ | × | × | × | 24 | 20 | 190 | 33 |
| Example 3 | 7.5 | 13.3 | 500 | 0.6 | ○ | ○ | ○ | × | × | 22 | 19 | 185 | 31 |
| Example 4 | 37.5 | 13.3 | 2500 | 2.8 | × | ○ | × | × | × | 20 | 19 | 183 | 30 |
| Example 5 | 0.8 | 10.0 | 35 | 0.1 | ○ | × | × | × | × | 24 | 19 | 190 | 38 |
| Example 6 | 1.5 | 10.0 | 70 | 0.2 | ○ | × | × | × | × | 22 | 19 | 188 | 35 |
| Example 7 | 7.5 | 10.0 | 350 | 0.8 | ○ | ○ | ○ | × | × | 21 | 18 | 185 | 33 |
| Example 8 | 15.0 | 10.0 | 700 | 1.5 | × | ○ | ○ | × | × | 20 | 18 | 182 | 31 |
| Example 9 | 1.0 | 6.7 | 33 | 0.2 | ○ | × | × | × | × | 22 | 19 | 185 | 39 |
| Example 10 | 1.5 | 6.7 | 50 | 0.2 | ○ | × | × | × | × | 22 | 18 | 183 | 38 |
| Example 11 | 3.0 | 6.7 | 100 | 0.5 | ○ | × | × | × | × | 21 | 18 | 181 | 37 |
| Example 12 | 15.0 | 6.7 | 500 | 2.3 | × | ○ | ○ | × | × | 20 | 17 | 180 | 37 |
| Example 13 | 2.0 | 5.0 | 47 | 0.4 | ○ | × | × | × | × | 20 | 18 | 179 | 41 |
| Example 14 | 3.0 | 5.0 | 70 | 0.6 | ○ | × | × | × | × | 19 | 16 | 175 | 39 |
| Example 15 | 6.0 | 5.0 | 140 | 1.2 | × | ○ | × | × | × | 18 | 16 | 173 | 38 |
| Example 16 | 3.0 | 3.3 | 50 | 0.9 | ○ | × | × | ○ | ○ | 25 | 18 | 150 | 43 |
| Example 17 | 4.0 | 3.3 | 67 | 1.2 | × | × | × | ○ | ○ | 24 | 16 | 148 | 41 |
| Example 18 | 6.0 | 3.3 | 100 | 1.8 | × | × | × | ○ | ○ | 20 | 15 | 145 | 39 |
| Example 19 | 2.0 | 2.5 | 23.33333 | 0.8 | ○ | × | × | ○ | ○ | 25 | 18 | 135 | 42 |
| Example 20 | 2.4 | 2.5 | 28 | 1.0 | × | × | × | ○ | ○ | 23 | 17 | 133 | 41 |
| Example 21 | 3.0 | 2.5 | 35 | 1.2 | × | × | × | ○ | ○ | 23 | 17 | 131 | 39 |
| Example 22 | 1.2 | 1.7 | 10 | 0.7 | ○ | × | × | × | × | 25 | 19 | 125 | 42 |
| Example 23 | 1.6 | 1.7 | 13.33333 | 1.0 | ○ | × | × | × | × | 24 | 18 | 123 | 42 |
| Example 24 | 2.4 | 1.7 | 20 | 1.4 | × | × | × | × | × | 24 | 18 | 123 | 41 |
| Comparative Example 1 | 0.8 | 13.3 | 50 | 0.1 | ○ | × | × | × | × | 27 | 60≦ | 95 | Standard |
| Comparative Example 2 | 37.5 | 13.3 | 2500 | 2.8 | × | ○ | × | × | × | 25 | 30 | 98 | −10 |
| Comparative Example 3 | 0.8 | 10.0 | 35 | 0.1 | ○ | × | × | × | × | 25 | 60≦ | 88 | Standard |
| Comparative Example 4 | 15.0 | 10.0 | 700 | 1.5 | × | ○ | ○ | × | × | 24 | 30 | 90 | −7 |
| Comparative Example 5 | 1.0 | 6.7 | 33 | 0.2 | ○ | × | × | × | × | 23 | 60≦ | 80 | Standard |
| Comparative Example 6 | 15.0 | 6.7 | 500 | 2.3 | × | ○ | ○ | × | × | 24 | 40 | 85 | −7 |
| Comparative Example 7 | 2.0 | 5.0 | 47 | 0.4 | ○ | × | × | × | × | 25 | 60≦ | 85 | Standard |
| Comparative Example 8 | 6.0 | 5.0 | 140 | 1.2 | × | ○ | × | × | × | 24 | 45 | 95 | −8 |
| Comparative Example 9 | 3.0 | 3.3 | 50 | 0.9 | ○ | × | × | ○ | × | 30 | 60≦ | 78 | Standard |
| Comparative Example 10 | 6.0 | 3.3 | 100 | 1.8 | × | × | × | ○ | ○ | 28 | 45 | 80 | −8 |
| Comparative Example 11 | 2.0 | 2.5 | 23.33333 | 0.8 | ○ | × | × | ○ | ○ | 35 | 60≦ | 75 | Standard |
| Comparative Example 12 | 3.0 | 2.5 | 35 | 1.2 | × | × | × | ○ | ○ | 34 | 30 | 80 | −9 |
| Comparative Example 13 | 1.2 | 1.7 | 10 | 0.7 | ○ | × | × | × | × | 50 | 60≦ | 50 | Standard |
| Comparative Example 14 | 2.4 | 1.7 | 20 | 1.4 | × | × | × | × | × | 48 | 60≦ | 50 | −10 |

TABLE 2

| | Battery structure | Number of electrode layers | Size | Thickness of heat dissipating member (mm) | Number of heat dissipating member | Material of heat dissipating member |
|---|---|---|---|---|---|---|
| Example 1 | Stacking-type laminate | 20 | About A8 | 0.05 | 1 sheet | Ceramics |
| Example 2 | Stacking-type laminate | 5 | About A8 | 0.05 | 1 sheet | Ceramics |
| Example 3 | Stacking-type laminate | 3 | About A8 | 0.01 | 1 sheet | Ceramics |
| Example 4 | Stacking-type laminate | 2 | About A8 | 0.01 | 1 sheet | Ceramics |
| Example 5 | Stacking-type laminate | 40 | About A7 | 0.1 | 1 sheet | Ceramics |
| Example 6 | Stacking-type laminate | 20 | About A7 | 0.01 | 1 sheet | Ceramics |
| Example 7 | Stacking-type laminate | 5 | About A7 | 0.01 | 1 sheet | Ceramics |
| Example 8 | Stacking-type laminate | 3 | About A7 | 0.1 | 1 sheet | Ceramics |
| Example 9 | Bipolar-type laminate | 50 | About A6 | 0.1 | 1 sheet | Carbon steel + Carbon |
| Example 10 | Bipolar-type laminate | 30 | About A6 | 0.1 | 1 sheet | Carbon steel + Carbon |
| Example 11 | Bipolar-type laminate | 15 | About A6 | 0.1 | 1 sheet | Carbon steel + Carbon |
| Example 12 | Bipolar-type laminate | 4 | About A6 | 0.1 | 1 sheet | Carbon steel + Carbon |
| Example 13 | Bipolar-type laminate | 50 | About A5 | 0.1 | 1 sheet | Aluminum + Carbon |
| Example 14 | Bipolar-type laminate | 30 | About A5 | 0.5 | 1 sheet | Aluminum + Carbon |
| Example 15 | Bipolar-type laminate | 15 | About A5 | 0.5 | 1 sheet | Aluminum + Carbon |
| Example 16 | Bipolar-type laminate | 60 | About A4 | 0.5 | 1 sheet | PE + Carbon |
| Example 17 | Bipolar-type laminate | 50 | About A4 | 0.1 | 1 sheet | Rubber + Carbon |
| Example 18 | Bipolar-type laminate | 30 | About A4 | 0.1 | 1 sheet | Aluminum + Carbon |
| Example 19 | Bipolar-type laminate | 90 | About A3 | 0.5 | 5 sheet | PE + Carbon |
| Example 20 | Bipolar-type laminate | 80 | About A3 | 0.5 | 4 sheet | PE + Carbon |
| Example 21 | Bipolar-type laminate | 70 | About A3 | 0.5 | 3 sheet | PE + Carbon |
| Example 22 | Bipolar-type | 200 | About A2 | 0.5 | 19 sheet | PE + Carbon |
| Example 23 | Bipolar-type | 150 | About A2 | 0.5 | 14 sheet | PE + Carbon |
| Example 24 | Bipolar-type | 100 | About A2 | 0.5 | 9 sheet | PE + Carbon |
| Comparative Example 1 | Stacking-type laminate | 20 | About A8 | None | None | — |
| Comparative Example 2 | Stacking-type laminate | 2 | About A8 | None | None | — |
| Comparative Example 3 | Stacking-type laminate | 40 | About A7 | None | None | — |
| Comparative Example 4 | Stacking-type laminate | 3 | About A7 | None | None | — |
| Comparative Example 5 | Bipolar-type laminate | 50 | About A6 | None | None | — |
| Comparative Example 6 | Bipolar-type laminate | 4 | About A6 | None | None | — |
| Comparative Example 7 | Bipolar-type laminate | 50 | About A5 | None | None | — |
| Comparative Example 8 | Bipolar-type laminate | 15 | About A5 | None | None | — |
| Comparative Example 9 | Bipolar-type laminate | 60 | About A4 | None | None | — |
| Comparative Example 10 | Bipolar-type laminate | 30 | About A4 | None | None | — |
| Comparative Example 11 | Bipolar-type laminate | 90 | About A3 | None | None | — |
| Comparative Example 12 | Bipolar-type laminate | 70 | About A3 | None | None | — |
| Comparative Example 13 | Bipolar-type | 200 | About A2 | None | None | — |
| Comparative Example 14 | Bipolar-type | 100 | About A2 | None | None | — |

| | Thermal conductivity of heat dissipating member (W/m/K) | Longer side: a (mm) | Shorter side: b (mm) | Thickness: c (mm) | Outer periphery: L (mm) | Area: S ($m^2$) | Diagonal line: d (mm) |
|---|---|---|---|---|---|---|---|
| Example 1 | 1.5 | 75 | 50 | 5 | 250 | 0.00375 | 90 |
| Example 2 | 1.5 | 75 | 50 | 1 | 250 | 0.00375 | 90 |
| Example 3 | 1.5 | 75 | 50 | 0.5 | 250 | 0.00375 | 90 |
| Example 4 | 1.5 | 75 | 50 | 0.1 | 250 | 0.00375 | 90 |
| Example 5 | 1.5 | 100 | 75 | 10 | 350 | 0.0075 | 125 |
| Example 6 | 1.5 | 100 | 75 | 5 | 350 | 0.0075 | 125 |
| Example 7 | 1.5 | 100 | 75 | 1 | 350 | 0.0075 | 125 |
| Example 8 | 1.5 | 100 | 75 | 0.5 | 350 | 0.0075 | 125 |
| Example 9 | 300 | 150 | 100 | 15 | 500 | 0.015 | 180 |
| Example 10 | 300 | 150 | 100 | 10 | 500 | 0.015 | 180 |
| Example 11 | 300 | 150 | 100 | 5 | 500 | 0.015 | 180 |
| Example 12 | 300 | 150 | 100 | 1 | 500 | 0.015 | 180 |
| Example 13 | 200 | 200 | 150 | 15 | 700 | 0.03 | 250 |
| Example 14 | 200 | 200 | 150 | 10 | 700 | 0.03 | 250 |
| Example 15 | 200 | 200 | 150 | 5 | 700 | 0.03 | 250 |
| Example 16 | 0.5 | 300 | 200 | 20 | 1000 | 0.06 | 361 |
| Example 17 | 0.5 | 300 | 200 | 15 | 1000 | 0.06 | 361 |
| Example 18 | 0.5 | 300 | 200 | 10 | 1000 | 0.06 | 361 |
| Example 19 | 0.5 | 400 | 300 | 60 | 1400 | 0.12 | 500 |
| Example 20 | 0.5 | 400 | 300 | 50 | 1400 | 0.12 | 500 |
| Example 21 | 0.5 | 400 | 300 | 40 | 1400 | 0.12 | 500 |
| Example 22 | 0.5 | 600 | 400 | 200 | 2000 | 0.24 | 721 |
| Example 23 | 0.5 | 600 | 400 | 150 | 2000 | 0.24 | 721 |
| Example 24 | 0.5 | 600 | 400 | 100 | 2000 | 0.24 | 721 |
| Comparative Example 1 | — | 75 | 50 | 5 | 250 | 0.00375 | 90 |
| Comparative Example 2 | — | 75 | 50 | 0.1 | 250 | 0.00375 | 90 |
| Comparative Example 3 | — | 100 | 75 | 10 | 350 | 0.0075 | 125 |
| Comparative Example 4 | — | 100 | 75 | 0.5 | 350 | 0.0075 | 125 |
| Comparative Example 5 | — | 150 | 100 | 15 | 500 | 0.015 | 180 |
| Comparative Example 6 | — | 150 | 100 | 1 | 500 | 0.015 | 180 |
| Comparative Example 7 | — | 200 | 150 | 15 | 700 | 0.03 | 250 |

TABLE 2-continued

| | | | | | | | |
|---|---|---|---|---|---|---|---|
| Comparative Example 8 | — | 200 | 150 | 5 | 700 | 0.03 | 250 |
| Comparative Example 9 | — | 300 | 200 | 20 | 1000 | 0.06 | 361 |
| Comparative Example 10 | — | 300 | 200 | 10 | 1000 | 0.06 | 361 |
| Comparative Example 11 | — | 400 | 300 | 60 | 1400 | 0.12 | 500 |
| Comparative Example 12 | — | 400 | 300 | 40 | 1400 | 0.12 | 500 |
| Comparative Example 13 | — | 600 | 400 | 200 | 2000 | 0.24 | 721 |
| Comparative Example 14 | — | 600 | 400 | 100 | 2000 | 0.24 | 721 |

The present invention is useful for a battery structure requiring high power, high capacity and/or high durability.

The above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A battery structure, comprising:
   a plurality of stacked unit cell layers, wherein each unit cell layer is formed by stacking a separate cathode active material layer formed on a surface of a separator for retaining an electrolyte, a separate anode active material layer formed on an opposite surface of the separator; and a collector formed on one of the cathode active material layer and the anode active material layer opposite the separator; and
   a plurality of solid heat dissipating members, one heat dissipating member disposed between and in contact with an outermost collector of two adjacent unit cell layers, wherein the heat dissipating member electrically connects the cathode active layer of one of the two unit cell layers to the anode active layer of the other unit cell layer.

2. The battery structure according to claim 1 wherein the heat dissipating member functions to absorb a vibration transmitted from an outside.

3. The battery structure according to claim 1 wherein a length of an outer periphery of the cathode active material layer or a length of an outer periphery of the anode active material layer is equal to or greater than 130 times of a thickness of the battery structure excluding the heat dissipating member.

4. The battery structure according to claim 1 wherein a length of an outer periphery of the cathode active material layer or a length of an outer periphery of the anode active material layer is 300 to 2000 times of a thickness of the battery structure excluding the heat dissipating member.

5. The battery structure according to claim 1 wherein a length of an outer periphery of the cathode active material layer or a length of an outer periphery of the anode active material layer is 750 to 1450 mm; and wherein a thickness of the battery structure excluding the heat dissipating member is 2 to 10 mm.

6. The battery structure according to claim 1 wherein a length of a diagonal line of the cathode active material layer or a length of a diagonal line of the anode active material layer is 260 to 550 mm.

7. The battery structure according to claim 1 wherein a thickness of the heat dissipating member is 0.01 to 1 mm.

8. The battery structure according to claim 1 wherein a thermal conductivity of the heat dissipating member is 0.1 to 450 W/m·k.

9. The battery structure according to claim 1 wherein one or both of the sheet material and carbon material of the heat dissipating member is a vibration absorbing material.

10. The battery structure according to claim 1 wherein a Shore A hardness of a separator of a first unit cell layer among the plurality of unit cell layers differs from a Shore A hardness of a separator of another unit cell layer.

11. The battery structure according to claim 1 wherein a Shore A hardness of each of the separators gradually increases from a separator positioned at a center of the battery structure towards the unit cell layer positioned at both ends in a stacking direction.

12. The battery structure according to claim 1 wherein a Shore A hardness of the separator is 20 to 110.

13. The battery structure according to claim 1 wherein a tortuosity of the separator is 0.5 to 2.0.

14. The battery structure according to claim 1 wherein the cathode active material layer includes a cathode active material; and wherein an average particle size of the cathode active material is 0.1 to 2 μm.

15. The battery structure according to claim 1 wherein the anode active material layer includes an anode active material; and wherein an average particle size of the anode active material is 0.1 to 2 μm.

16. The battery structure according to claim 1, further comprising a covering material for encasing the battery structure, wherein the covering material is made from a composite material consisting of a polymer material and a metal material and wherein opposing ends of each of the plurality of heat dissipating members contact the covering material.

17. A battery assembly comprising a plurality of the battery structures according to claim 1 wherein the plurality of battery structures are connected in series or in parallel or in a combination of in series and in parallel.

18. A vehicle comprising the battery assembly according to claim 17 mounted thereon.

19. The battery structure according to claim 1 wherein the heat dissipating member is configured to electrically connect a space between the unit cell layers.

20. The battery structure according to claim 1 wherein the sheet material is a metal material and the carbon material is graphite crimped on the metal material.

21. The battery structure according to claim 1 wherein the sheet material is resin and the carbon material is a carbon filler dispersed in the resin material.

22. The battery structure according to claim 1, wherein the heat dissipating member is formed from a composite material in which a conductive material is dispersed into a polymer.

23. The battery structure according to claim 1, wherein the heat dissipating member is formed by crimping graphite on a sheet material consisting of a metal material.

24. A method of making a battery structure, comprising:
alternately stacking a cathode active material layer formed on a surface of a first collector, a separator for retaining an electrolyte opposite the first collector, and an anode active material layer formed on a surface of a second collector such that the second collector is opposite the separator to form a first unit cell layer;
alternately stacking a cathode active material layer formed on a surface of a third collector, a separator for retaining an electrolyte opposite the third collector, and an anode active material layer formed on a surface of a fourth collector such that the fourth collector is opposite the separator to form a second unit cell layer;
disposing a solid heat dissipating member between the first unit cell layer and the second unit cell layer with the solid heat dissipating member contacting one of the first and second collectors and one of the third and fourth collectors, wherein the heat dissipating member comprises sheet material and a carbon material; and
electrically connecting the cathode active layer of one of the first and second unit cell layers to the anode active layer of the other unit cell layer the unit cell layers with the heat dissipating member.

25. The battery structure according to claim 1, further comprising:
an anode tab, wherein the anode tab and an outermost unit cell collector are electrically connected via one of the plurality of heat dissipating members disposed between the anode tab and the outermost unit cell collector; and
a cathode tab, wherein the cathode tab and an opposite outermost unit cell collector are electrically connected via another of the plurality of heat dissipating members disposed between the cathode tab and the opposite outermost unit cell collector.

26. The battery structure according to claim 25, further comprising:
a covering material for encasing the battery structure, wherein the covering material is sealed along each of the anode and cathode tabs.

27. The battery structure according to claim 26 wherein the heat dissipating member is disposed between at least one of an uppermost and lowermost unit cell layers and the covering material.

* * * * *